United States Patent
Daniel et al.

(10) Patent No.: US 10,236,924 B2
(45) Date of Patent: Mar. 19, 2019

(54) REDUCING OUT-OF-CHANNEL NOISE IN A WIRELESS DISTRIBUTION SYSTEM (WDS)

(71) Applicant: Corning Optical Communications Wireless Ltd, Airport (IL)

(72) Inventors: Liav Moshe Daniel, Gedera (IL); Roi Yosy Ziv, Petah Tiqwa (IL)

(73) Assignee: Corning Optical Communications Wireless Ltd, Airport (IL)

( * ) Notice: Subject to any disclaimer, the term of this patent is extended or adjusted under 35 U.S.C. 154(b) by 0 days.

(21) Appl. No.: 15/086,861

(22) Filed: Mar. 31, 2016

(65) Prior Publication Data

US 2017/0288716 A1    Oct. 5, 2017

(51) Int. Cl.
H04B 1/12    (2006.01)
H04B 1/10    (2006.01)

(52) U.S. Cl.
CPC ....... *H04B 1/12* (2013.01); *H04B 2001/1045* (2013.01)

(58) Field of Classification Search
CPC ........................................................ H04B 1/12
See application file for complete search history.

(56) References Cited

U.S. PATENT DOCUMENTS

| | | |
|---|---|---|
| 3,663,762 A | 5/1972 | Joel, Jr. |
| 4,365,865 A | 12/1982 | Stiles |
| 4,449,246 A | 5/1984 | Seiler et al. |
| 4,573,212 A | 2/1986 | Lipsky |
| 4,665,560 A | 5/1987 | Lange |
| 4,812,851 A | 3/1989 | Giubardo |
| 4,867,527 A | 9/1989 | Dotti et al. |

(Continued)

FOREIGN PATENT DOCUMENTS

| | | |
|---|---|---|
| AU | 645192 B | 10/1992 |
| AU | 731180 B2 | 3/1998 |

(Continued)

OTHER PUBLICATIONS

3GPP TS 36.101 version 12.6.0 Release 12, Apr. 2015.*

(Continued)

*Primary Examiner* — Berhanu Tadese
(74) *Attorney, Agent, or Firm* — C. Keith Montgomery

(57) ABSTRACT

Embodiments of the disclosure relate to reducing out-of-channel noise in a wireless distribution system (WDS). A digital filter in a remote unit is configured to suppress out-of-channel noise in a downlink digital communications signal based on at least one filter configuration parameter received from a control circuit. The control circuit is configured to determine the filter configuration parameter based on physical characteristics of the downlink digital communications signal. By suppressing the out-of-channel noise of the downlink digital communications signal, it is possible to provide a downlink RF communications signal communicated from the remote unit that complies with a spectrum emission mask (SEM). Further, by suppressing the out-of-channel noise at the remote unit, it is not necessary for a central unit to perform digital filtering before distributing the downlink digital communications signal to the remote unit, thus helping reduce complexity, cost, physical size, and power consumption of the central unit.

23 Claims, 9 Drawing Sheets

(56) References Cited

U.S. PATENT DOCUMENTS

| | | |
|---|---|---|
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebott |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,669 B1 * | 10/2001 | Flood .................. H01S 3/067 359/341.3 |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |

(56) References Cited

U.S. PATENT DOCUMENTS

| | | | |
|---|---|---|---|
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,526 B1 * | 10/2002 | Minelly ............ H01S 3/06754 |
| | | | 359/337.1 |
| 6,459,989 B1 | 10/2002 | Kirkpatrick et al. |
| 6,472,952 B1 | 10/2002 | Sakai et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,529,715 B1 * | 3/2003 | Kitko ................ H03F 1/486 |
| | | | 330/124 R |
| 6,535,330 B1 | 3/2003 | Lelic et al. |
| 6,535,720 B1 | 3/2003 | Kintis et al. |
| 6,556,551 B1 | 4/2003 | Schwartz |
| 6,570,913 B1 | 5/2003 | Chen |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 * | 7/2003 | Wright ............... H03F 1/3241 |
| | | | 330/149 |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,188 B1 * | 10/2004 | Blahut ................ H04J 3/0682 |
| | | | 348/E7.07 |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,035,671 B2 | 4/2006 | Solum |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |

(56) References Cited

U.S. PATENT DOCUMENTS

| | | |
|---|---|---|
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kum |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,489,641 B2 | 2/2009 | Miller et al. |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pemu et al. |
| 7,668,565 B2 | 2/2010 | Ylänen et al. |
| 7,672,643 B2 | 3/2010 | Loh |
| 7,675,936 B2 | 3/2010 | Mizutani et al. |
| 7,688,811 B2 | 3/2010 | Kubler et al. |
| 7,693,486 B2 | 4/2010 | Casslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,756,480 B2 | 7/2010 | Loh |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Patin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,135,102 B2 | 3/2012 | Wiwel et al. |
| 8,175,535 B2 | 5/2012 | Mu |
| 8,213,401 B2 | 7/2012 | Fischer et al. |
| 8,223,795 B2 | 7/2012 | Cox et al. |
| 8,226,003 B2 | 7/2012 | Frederick et al. |
| 8,238,463 B1 | 8/2012 | Arslan et al. |
| 8,270,387 B2 | 9/2012 | Cannon et al. |
| 8,290,447 B2 * | 10/2012 | Sutton ............... H04B 1/0475 455/165.1 |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,428,201 B1 | 4/2013 | McHann, Jr. et al. |
| 8,428,510 B2 | 4/2013 | Stratford et al. |

(56) References Cited

U.S. PATENT DOCUMENTS

| | | | |
|---|---|---|---|
| 8,462,683 B2 | 6/2013 | Uyehara et al. | |
| 8,472,579 B2 | 6/2013 | Uyehara et al. | |
| 8,509,215 B2 | 8/2013 | Stuart | |
| 8,509,850 B2 | 8/2013 | Zavadsky et al. | |
| 8,526,970 B2 | 9/2013 | Wala et al. | |
| 8,532,242 B2 | 9/2013 | Fischer et al. | |
| 8,626,245 B2 | 1/2014 | Zavadsky et al. | |
| 8,634,766 B2 | 1/2014 | Hobbs et al. | |
| 8,737,454 B2 | 5/2014 | Wala et al. | |
| 8,743,718 B2 | 6/2014 | Grenier et al. | |
| 8,743,756 B2 | 6/2014 | Uyehara et al. | |
| 8,837,659 B2 | 9/2014 | Uyehara et al. | |
| 8,837,940 B2 | 9/2014 | Smith et al. | |
| 8,873,585 B2 | 10/2014 | Oren et al. | |
| 8,903,346 B2 | 12/2014 | Fischer et al. | |
| 8,909,133 B2 | 12/2014 | Hobbs et al. | |
| 8,929,288 B2 | 1/2015 | Stewart et al. | |
| 8,982,995 B1 * | 3/2015 | Van Cai | H04B 1/0475 375/297 |
| 9,042,838 B2 | 5/2015 | Braithwaite | |
| 9,178,635 B2 | 11/2015 | Ben-Shlomo | |
| 9,203,462 B2 | 12/2015 | Petrovic et al. | |
| 9,246,721 B1 * | 1/2016 | Martinez | H04B 1/0007 |
| 9,247,543 B2 * | 1/2016 | Berlin | H04W 72/0453 |
| 9,385,763 B1 * | 7/2016 | Shi | H04B 1/1036 |
| 9,455,760 B1 * | 9/2016 | Dick | H03F 1/3247 |
| 9,807,700 B2 * | 10/2017 | Harel | H04W 52/243 |
| 2001/0036163 A1 | 11/2001 | Sabat, Jr. et al. | |
| 2001/0036199 A1 | 11/2001 | Terry | |
| 2002/0003645 A1 | 1/2002 | Kim et al. | |
| 2002/0009070 A1 | 1/2002 | Indsay et al. | |
| 2002/0012336 A1 | 1/2002 | Hughes et al. | |
| 2002/0012495 A1 | 1/2002 | Sasai et al. | |
| 2002/0016827 A1 | 2/2002 | McCabe et al. | |
| 2002/0045519 A1 | 4/2002 | Watterson et al. | |
| 2002/0048071 A1 | 4/2002 | Suzuki et al. | |
| 2002/0051434 A1 | 5/2002 | Ozluturk et al. | |
| 2002/0075906 A1 | 6/2002 | Cole et al. | |
| 2002/0092347 A1 | 7/2002 | Niekerk et al. | |
| 2002/0097564 A1 | 7/2002 | Struhsaker et al. | |
| 2002/0103012 A1 | 8/2002 | Kim et al. | |
| 2002/0111149 A1 | 8/2002 | Shoki | |
| 2002/0111192 A1 | 8/2002 | Thomas et al. | |
| 2002/0114038 A1 | 8/2002 | Amon et al. | |
| 2002/0123365 A1 | 9/2002 | Thorson et al. | |
| 2002/0126967 A1 | 9/2002 | Panak et al. | |
| 2002/0128009 A1 | 9/2002 | Boch et al. | |
| 2002/0130778 A1 | 9/2002 | Nicholson | |
| 2002/0181668 A1 | 12/2002 | Masoian et al. | |
| 2002/0190845 A1 | 12/2002 | Moore | |
| 2002/0191710 A1 * | 12/2002 | Jeckeln | H03F 1/3247 375/296 |
| 2002/0197984 A1 | 12/2002 | Monin et al. | |
| 2003/0002604 A1 | 1/2003 | Fifield et al. | |
| 2003/0007214 A1 | 1/2003 | Aburakawa et al. | |
| 2003/0016418 A1 | 1/2003 | Westbrook et al. | |
| 2003/0022645 A1 | 1/2003 | Runzo | |
| 2003/0045284 A1 | 3/2003 | Copley et al. | |
| 2003/0069922 A1 | 4/2003 | Arunachalam | |
| 2003/0078074 A1 | 4/2003 | Sesay et al. | |
| 2003/0112826 A1 | 6/2003 | Ashwood Smith et al. | |
| 2003/0141962 A1 | 7/2003 | Barink | |
| 2003/0161637 A1 | 8/2003 | Yamamoto et al. | |
| 2003/0165287 A1 | 9/2003 | Krill et al. | |
| 2003/0174099 A1 | 9/2003 | Bauer et al. | |
| 2003/0209601 A1 | 11/2003 | Chung | |
| 2003/0216129 A1 * | 11/2003 | Khalil | H04B 1/28 455/197.2 |
| 2004/0001719 A1 | 1/2004 | Sasaki | |
| 2004/0008114 A1 | 1/2004 | Sawyer | |
| 2004/0017785 A1 | 1/2004 | Zelst | |
| 2004/0037565 A1 | 2/2004 | Young et al. | |
| 2004/0041714 A1 | 3/2004 | Forster | |
| 2004/0043764 A1 | 3/2004 | Bigham et al. | |
| 2004/0047313 A1 | 3/2004 | Rumpf et al. | |
| 2004/0078151 A1 | 4/2004 | Edjadeff et al. | |
| 2004/0095907 A1 | 5/2004 | Agee et al. | |
| 2004/0100930 A1 | 5/2004 | Shapira et al. | |
| 2004/0106435 A1 | 6/2004 | Bauman et al. | |
| 2004/0126068 A1 | 7/2004 | Van Bijsterveld | |
| 2004/0126107 A1 | 7/2004 | Jay et al. | |
| 2004/0139477 A1 | 7/2004 | Russell et al. | |
| 2004/0146020 A1 | 7/2004 | Kubler et al. | |
| 2004/0149736 A1 | 8/2004 | Clothier | |
| 2004/0151164 A1 | 8/2004 | Kubler et al. | |
| 2004/0151503 A1 | 8/2004 | Kashima et al. | |
| 2004/0157623 A1 | 8/2004 | Splett | |
| 2004/0160912 A1 | 8/2004 | Kubler et al. | |
| 2004/0160913 A1 | 8/2004 | Kubler et al. | |
| 2004/0162084 A1 | 8/2004 | Wang | |
| 2004/0162115 A1 | 8/2004 | Smith et al. | |
| 2004/0162116 A1 | 8/2004 | Han et al. | |
| 2004/0165573 A1 | 8/2004 | Kubler et al. | |
| 2004/0175173 A1 | 9/2004 | Deas | |
| 2004/0196404 A1 | 10/2004 | Loheit et al. | |
| 2004/0202257 A1 | 10/2004 | Mehta et al. | |
| 2004/0203703 A1 | 10/2004 | Fischer | |
| 2004/0203704 A1 | 10/2004 | Ommodt et al. | |
| 2004/0203846 A1 | 10/2004 | Caronni et al. | |
| 2004/0204109 A1 | 10/2004 | Hoppenstein | |
| 2004/0208526 A1 | 10/2004 | Mibu | |
| 2004/0208643 A1 | 10/2004 | Roberts et al. | |
| 2004/0215723 A1 | 10/2004 | Chadha | |
| 2004/0218873 A1 | 11/2004 | Nagashima et al. | |
| 2004/0233877 A1 | 11/2004 | Lee et al. | |
| 2004/0252786 A1 * | 12/2004 | McHenry | H03F 1/3229 375/297 |
| 2004/0258105 A1 | 12/2004 | Spathas et al. | |
| 2004/0267971 A1 | 12/2004 | Seshadri | |
| 2005/0052287 A1 | 3/2005 | Whitesmith et al. | |
| 2005/0058451 A1 | 3/2005 | Ross | |
| 2005/0068179 A1 | 3/2005 | Roesner | |
| 2005/0076982 A1 | 4/2005 | Metcalf et al. | |
| 2005/0078006 A1 | 4/2005 | Hutchins | |
| 2005/0085186 A1 | 4/2005 | Sandrin | |
| 2005/0093679 A1 | 5/2005 | Zai et al. | |
| 2005/0099343 A1 | 5/2005 | Asrani et al. | |
| 2005/0116821 A1 | 6/2005 | Wilsey et al. | |
| 2005/0123232 A1 | 6/2005 | Piede et al. | |
| 2005/0141545 A1 | 6/2005 | Fein et al. | |
| 2005/0143077 A1 | 6/2005 | Charbonneau | |
| 2005/0147067 A1 | 7/2005 | Mani et al. | |
| 2005/0147071 A1 | 7/2005 | Karaoguz et al. | |
| 2005/0148306 A1 | 7/2005 | Hiddink | |
| 2005/0159108 A1 | 7/2005 | Fletcher | |
| 2005/0174236 A1 | 8/2005 | Brookner | |
| 2005/0176458 A1 | 8/2005 | Shklarsky et al. | |
| 2005/0201323 A1 | 9/2005 | Mani et al. | |
| 2005/0201761 A1 | 9/2005 | Bartur et al. | |
| 2005/0219050 A1 | 10/2005 | Martin | |
| 2005/0224585 A1 | 10/2005 | Durrant et al. | |
| 2005/0226625 A1 | 10/2005 | Wake et al. | |
| 2005/0232636 A1 | 10/2005 | Durrant et al. | |
| 2005/0242188 A1 | 11/2005 | Vesuna | |
| 2005/0252971 A1 | 11/2005 | Howarth et al. | |
| 2005/0266797 A1 | 12/2005 | Utsumi et al. | |
| 2005/0266854 A1 | 12/2005 | Niiho et al. | |
| 2005/0269930 A1 | 12/2005 | Shimizu et al. | |
| 2005/0271396 A1 | 12/2005 | Iannelli | |
| 2005/0272439 A1 | 12/2005 | Picciriello et al. | |
| 2006/0002326 A1 | 1/2006 | Vesuna | |
| 2006/0014548 A1 | 1/2006 | Bolin | |
| 2006/0017633 A1 | 1/2006 | Pronkine | |
| 2006/0028352 A1 | 2/2006 | McNamara et al. | |
| 2006/0045054 A1 | 3/2006 | Utsumi et al. | |
| 2006/0045524 A1 | 3/2006 | Lee et al. | |
| 2006/0045525 A1 | 3/2006 | Lee et al. | |
| 2006/0053324 A1 | 3/2006 | Giat et al. | |
| 2006/0056327 A1 | 3/2006 | Coersmeier | |
| 2006/0062579 A1 | 3/2006 | Kim et al. | |
| 2006/0083520 A1 | 4/2006 | Healey et al. | |
| 2006/0094470 A1 | 5/2006 | Wake et al. | |
| 2006/0104643 A1 | 5/2006 | Lee et al. | |
| 2006/0159388 A1 | 7/2006 | Kawase et al. | |

(56) References Cited

U.S. PATENT DOCUMENTS

| | | |
|---|---|---|
| 2006/0160550 A1 | 7/2006 | Edwards |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0254592 A1* | 11/2007 | McCallister .......... H03F 1/0205 455/67.11 |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pemu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pemu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pemu et al. |
| 2008/0280569 A1 | 11/2008 | Hazani et al. |
| 2008/0291830 A1 | 11/2008 | Pemu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0006194 A1 | 1/2009 | Sridharan et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0061940 A1 | 3/2009 | Scheinert et al. |
| 2009/0067402 A1 | 3/2009 | Forenza et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0274073 A1* | 11/2009 | Sutton .................... H04W 4/20 370/280 |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0131214 A1* | 5/2010 | Seely .................... G01R 31/30 702/58 |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |

(56) References Cited

U.S. PATENT DOCUMENTS

| | | |
|---|---|---|
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0227575 A1* | 9/2010 | Rofougaran ........... H01Q 3/267 455/127.1 |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pemu |
| 2011/0021224 A1 | 1/2011 | Koskinen et al. |
| 2011/0026844 A1 | 2/2011 | Francois et al. |
| 2011/0026932 A1 | 2/2011 | Yeh et al. |
| 2011/0032879 A1* | 2/2011 | Beaudin ............ H04B 7/15542 370/328 |
| 2011/0045767 A1 | 2/2011 | Rofougaran et al. |
| 2011/0051906 A1* | 3/2011 | Cioffi ...................... H04B 3/32 379/32.04 |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0130163 A1* | 6/2011 | Saban ................. H04W 88/085 455/517 |
| 2011/0149879 A1 | 6/2011 | Noriega et al. |
| 2011/0158081 A1* | 6/2011 | Wang ...................... H03F 1/304 370/201 |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0274021 A1 | 11/2011 | He et al. |
| 2011/0281536 A1 | 11/2011 | Lee et al. |
| 2012/0052892 A1* | 3/2012 | Braithwaite ........... H04B 1/525 455/501 |
| 2012/0099490 A1 | 4/2012 | Kummetz et al. |
| 2012/0100813 A1 | 4/2012 | Mow et al. |
| 2012/0155572 A1* | 6/2012 | Kim ...................... H03F 1/3247 375/297 |
| 2012/0177026 A1 | 7/2012 | Uyehara et al. |
| 2013/0012195 A1 | 1/2013 | Sabat, Jr. et al. |
| 2013/0070816 A1 | 3/2013 | Aoki et al. |
| 2013/0071112 A1 | 3/2013 | Melester et al. |
| 2013/0089332 A1 | 4/2013 | Sauer et al. |
| 2013/0095870 A1 | 4/2013 | Phillips et al. |
| 2013/0107926 A1* | 5/2013 | Xia ...................... H03G 3/3042 375/224 |
| 2013/0210490 A1 | 8/2013 | Fischer et al. |
| 2013/0252651 A1 | 9/2013 | Zavadsky et al. |
| 2013/0260705 A1 | 10/2013 | Stratford |
| 2013/0273854 A1 | 10/2013 | Zhang et al. |
| 2013/0295980 A1 | 11/2013 | Reuven et al. |
| 2014/0016583 A1 | 1/2014 | Smith |
| 2014/0031031 A1* | 1/2014 | Gauvreau ............. H04L 5/0053 455/426.1 |
| 2014/0037292 A1* | 2/2014 | Stapleton ............... H04B 10/27 398/68 |
| 2014/0072064 A1 | 3/2014 | Lemson et al. |
| 2014/0112667 A1 | 4/2014 | Neukirch et al. |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |
| 2014/0341315 A1* | 11/2014 | Cova ..................... H04B 1/0475 375/296 |
| 2014/0378180 A1* | 12/2014 | Schwent ............. H04W 52/241 455/522 |
| 2015/0011233 A1* | 1/2015 | Kazmi .................. H04W 16/14 455/454 |
| 2015/0016441 A1 | 1/2015 | Hanson et al. |
| 2015/0031316 A1 | 1/2015 | Berlin et al. |
| 2015/0055580 A1* | 2/2015 | Lim ...................... H04W 52/325 370/329 |
| 2015/0061762 A1* | 3/2015 | Charlon ................ H03F 1/3258 330/149 |
| 2015/0063323 A1* | 3/2015 | Sadek .................. H04W 72/1215 370/336 |
| 2015/0171878 A1* | 6/2015 | Schafferer ............... H03M 1/74 375/297 |
| 2015/0195055 A1 | 7/2015 | Ben-Shlomo |
| 2015/0229386 A1* | 8/2015 | Lange ................ H04B 7/15507 370/317 |
| 2016/0088569 A1* | 3/2016 | Frank .................. H04W 52/146 455/522 |
| 2016/0094267 A1 | 3/2016 | Petrovic et al. |
| 2016/0105816 A1 | 4/2016 | Berlin et al. |
| 2016/0134325 A1* | 5/2016 | Tageman ................ H04B 1/525 455/83 |
| 2016/0212640 A1* | 7/2016 | Kim ....................... H04W 24/04 |
| 2016/0226653 A1 | 8/2016 | Bharadia et al. |
| 2016/0249346 A1 | 8/2016 | Harel |
| 2016/0278019 A1* | 9/2016 | Langer ................... H04W 52/04 |
| 2016/0301436 A1 | 10/2016 | Zou et al. |
| 2016/0329631 A1* | 11/2016 | Rheinfelder ........... H01Q 1/246 |
| 2016/0352497 A1* | 12/2016 | Daniel .................... H04L 5/16 |
| 2017/0064565 A1 | 3/2017 | Berlin et al. |
| 2017/0135058 A1* | 5/2017 | Ghannouchi ........... H04B 1/04 |
| 2017/0208622 A1* | 7/2017 | Mizrahi ................. H04W 74/002 |
| 2017/0288716 A1* | 10/2017 | Daniel .................... H04B 1/12 |
| 2017/0318561 A1* | 11/2017 | Harel .................. H04W 72/0493 |
| 2017/0331599 A1* | 11/2017 | Tang ................ H04L 25/03834 |

FOREIGN PATENT DOCUMENTS

| | | |
|---|---|---|
| CA | 2065090 C | 2/1998 |
| CA | 2242707 A1 | 1/1999 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0993124 A2 | 4/2000 |

(56) References Cited

FOREIGN PATENT DOCUMENTS

| | | | |
|---|---|---|---|
| EP | 1037411 | A2 | 9/2000 |
| EP | 1179895 | A1 | 2/2002 |
| EP | 1267447 | A1 | 12/2002 |
| EP | 1347584 | A2 | 9/2003 |
| EP | 1363352 | A1 | 11/2003 |
| EP | 1391897 | A1 | 2/2004 |
| EP | 1443687 | A1 | 8/2004 |
| EP | 1455550 | A2 | 9/2004 |
| EP | 1501206 | A1 | 1/2005 |
| EP | 1503451 | A1 | 2/2005 |
| EP | 1530316 | A1 | 5/2005 |
| EP | 1511203 | B1 | 3/2006 |
| EP | 1267447 | B1 | 8/2006 |
| EP | 1693974 | A1 | 8/2006 |
| EP | 1742388 | A1 | 1/2007 |
| EP | 1227605 | B1 | 1/2008 |
| EP | 1954019 | A1 | 8/2008 |
| EP | 1968250 | A1 | 9/2008 |
| EP | 1056226 | B1 | 4/2009 |
| EP | 1357683 | B1 | 5/2009 |
| EP | 2081334 | A1 | 7/2009 |
| EP | 2276298 | A1 | 1/2011 |
| EP | 1570626 | B1 | 11/2013 |
| EP | 3166231 | A1 * | 5/2017 ........... H04B 17/309 |
| EP | 3166231 | A1 * | 5/2017 ........... H04B 17/309 |
| GB | 2323252 | A | 9/1998 |
| GB | 2370170 | A | 6/2002 |
| GB | 2399963 | A | 9/2004 |
| GB | 2428149 | A | 1/2007 |
| JP | H4189036 | A | 7/1992 |
| JP | 05260018 | A | 10/1993 |
| JP | 09083450 | A | 3/1997 |
| JP | 09162810 | A | 6/1997 |
| JP | 09200840 | A | 7/1997 |
| JP | 11068675 | A | 3/1999 |
| JP | 2000152300 | A | 5/2000 |
| JP | 2000341744 | A | 12/2000 |
| JP | 2002264617 | A | 9/2002 |
| JP | 2002353813 | A | 12/2002 |
| JP | 2003148653 | A | 5/2003 |
| JP | 2003172827 | A | 6/2003 |
| JP | 2004172734 | A | 6/2004 |
| JP | 2004245963 | A | 9/2004 |
| JP | 2004247090 | A | 9/2004 |
| JP | 2004264901 | A | 9/2004 |
| JP | 2004265624 | A | 9/2004 |
| JP | 2004317737 | A | 11/2004 |
| JP | 2004349184 | A | 12/2004 |
| JP | 2005018175 | A | 1/2005 |
| JP | 2005087135 | A | 4/2005 |
| JP | 2005134125 | A | 5/2005 |
| JP | 2007228603 | A | 9/2007 |
| JP | 2008172597 | A | 7/2008 |
| JP | 2013062558 | A | 4/2013 |
| KR | 20010055088 | A | 7/2001 |
| WO | 9603823 | A1 | 2/1996 |
| WO | 9729608 | A1 | 8/1997 |
| WO | 9810600 | A1 | 3/1998 |
| WO | 00042721 | A1 | 7/2000 |
| WO | 0072475 | A1 | 11/2000 |
| WO | 0178434 | A1 | 10/2001 |
| WO | 0184760 | A1 | 11/2001 |
| WO | 0221183 | A1 | 3/2002 |
| WO | 0230141 | A1 | 4/2002 |
| WO | 02091599 | A2 | 11/2002 |
| WO | 02102102 | A1 | 12/2002 |
| WO | 03024027 | A1 | 3/2003 |
| WO | 03098175 | A1 | 11/2003 |
| WO | 2004030154 | A2 | 4/2004 |
| WO | 2004047472 | A1 | 6/2004 |
| WO | 2004056019 | A1 | 7/2004 |
| WO | 2004059934 | A1 | 7/2004 |
| WO | 2004086795 | A2 | 10/2004 |
| WO | 2004093471 | A2 | 10/2004 |
| WO | 2005062505 | A1 | 7/2005 |
| WO | 2005069203 | A2 | 7/2005 |
| WO | 2005073897 | A1 | 8/2005 |
| WO | 2005079386 | A2 | 9/2005 |
| WO | 2005101701 | A2 | 10/2005 |
| WO | 2005111959 | A2 | 11/2005 |
| WO | 2006011778 | A1 | 2/2006 |
| WO | 2006018592 | A1 | 2/2006 |
| WO | 2006019392 | A1 | 2/2006 |
| WO | 2006039941 | A1 | 4/2006 |
| WO | 2006051262 | A1 | 5/2006 |
| WO | 2006060754 | A1 | 6/2006 |
| WO | 2006077569 | A1 | 7/2006 |
| WO | 2006105185 | A2 | 10/2006 |
| WO | 2006133609 | A1 | 12/2006 |
| WO | 2006136811 | A1 | 12/2006 |
| WO | 2007048427 | A1 | 5/2007 |
| WO | 2007077451 | A1 | 7/2007 |
| WO | 2007088561 | A1 | 8/2007 |
| WO | 2007091026 | A1 | 8/2007 |
| WO | 2008008249 | A2 | 1/2008 |
| WO | 2008027213 | A2 | 3/2008 |
| WO | 2008033298 | A2 | 3/2008 |
| WO | 2008039830 | A2 | 4/2008 |
| WO | 2008116014 | A2 | 9/2008 |
| WO | 2009029077 | A1 | 3/2009 |
| WO | 2006046088 | A1 | 5/2009 |
| WO | 2010022156 | A2 | 2/2010 |
| WO | 2010090999 | A1 | 8/2010 |
| WO | 2010126667 | A1 | 11/2010 |
| WO | 2010132739 | A1 | 11/2010 |
| WO | 2010151849 | A2 | 12/2010 |
| WO | 2011023592 | A1 | 3/2011 |
| WO | 2011100095 | A1 | 8/2011 |
| WO | 2011139939 | A1 | 11/2011 |
| WO | 2012058061 | A1 | 5/2012 |
| WO | 2012148938 | A1 | 11/2012 |
| WO | 2012148940 | A1 | 11/2012 |
| WO | 2013028197 | A1 | 2/2013 |
| WO | 2013096563 | A1 | 6/2013 |
| WO | 2013122915 | A1 | 8/2013 |
| WO | 2013184801 | A2 | 12/2013 |
| WO | 2014072947 | A1 | 5/2014 |
| WO | 2015011702 | A1 | 1/2015 |
| WO | 2015089719 | A1 | 6/2015 |
| WO | WO 2015183791 | A1 * | 12/2015 ........... H04W 24/02 |
| WO | WO-2015183791 | A1 * | 12/2015 ........... H04W 24/02 |
| WO | 2016124248 | A1 | 8/2016 |

OTHER PUBLICATIONS

Notice of Allowance for U.S. Appl. No. 13/873,927, dated Mar. 10, 2017, 8 pages (Cited in the Applicant's IDS , dated Jun. 11, 2018).*

Final Office Action for U.S. Appl. No. 15/042,532, dated Mar. 17, 2017, 16 pages (Cited in the Applicant's IDS, dated Jun. 11, 2018).*

Non-Final Office Action for U.S. Appl. No. 15/794,605, dated Apr. 19, 2018, 22 pages (Cited in the Applicant's IDS, dated Jun. 11, 2018).*

Notice of Allowance for U.S. Appl. No. 15/350,503, dated Jan. 10, 2018, 8 pages (Cited in the Applicant's IDS, dated Jun. 11, 2018).*

Non-Final Office Action for U.S. Appl. No. 15/350,503, dated Jul. 3, 2017, 9 pages (Cited in the Applicant's IDS, dated Jun. 11, 2018).*

Non-Final Office Action for U.S. Appl. No. 15/350,503, dated Jul. 3, 2017, 9 pages (Cited in the Applicant's IDS, dated Jun. 23, 2018).*

Author Unknown, "Fiber Optic Distributed Antenna System," Installation and Users Guide, ERAU Version 1.5, May 2002, Andrews Corporation, 53 pages.

Notice of Allowance for U.S. Appl. No. 13/873,927, dated Mar. 10, 2017, 8 pages.

Final Office Action for U.S. Appl. No. 15/042,532, dated Mar. 17, 2017, 16 pages.

Non-Final Office Action for U.S. Appl. No. 15/794,605, dated Apr. 19, 2018, 22 pages.

Notice of Allowance for U.S. Appl. No. 15/350,503, dated Jan. 10, 2018, 8 pages.

(56) References Cited

OTHER PUBLICATIONS

Non-Final Office Action for U.S. Appl. No. 15/350,503, dated Jul. 3, 2017, 9 pages.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.

Cho, Bong Youl et al. "The Forward Link Performance of a PCS System with an AGC," 4th CDMA International Conference and Exhibition, "The Realization of IMT-2000," 1999, 10 pages.

Chu, Ta-Shing et al. "Fiber optic microcellular radio", IEEE Transactions on Vehicular Technology, Aug. 1991, pp. 599-606, vol. 40, Issue 3.

Cooper, A.J., "Fiber/Radio for the Provision of Cordless/Mobile Telephony Services in the Access Network," Electronics Letters, 1990, pp. 2054-2056, vol. 26.

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.

Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.

Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.

Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.

Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.

Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.

Monro, T.M., et al., "Holey Fibers with Random Cladding Distributions," Optics Letters, Feb. 15, 2000, vol. 25, No. 4, pp. 206-208.

Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.

Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.

Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.

Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.

Author Unknown, RFID Technology Overview, Date Unknown, 11 pages.

Opatic, D., "Radio over Fiber Technology for Wireless Access," Ericsson, Oct. 17, 2009, 6 pages.

Paulraj, A.J., et al., "An Overview of MIMO Communications—A Key to Gigabit Wireless," Proceedings of the IEEE, Feb. 2004, vol. 92, No. 2, 34 pages.

Pickrell, G.R., et al., "Novel Techniques for the Fabrication of Holey Optical Fibers," Proceedings of SPIE, Oct. 28-Nov. 2, 2001, vol. 4578, 2001, pp. 271-282.

Roh, W., et al., "MIMO Channel Capacity for the Distributed Antenna Systems," Proceedings of the 56th IEEE Vehicular Technology Conference, Sep. 2002, vol. 2, pp. 706-709.

Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.

Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.

Shen, C., et al., "Comparison of Channel Capacity for MIMO-DAS versus MIMO-CAS," The 9th Asia-Pacific Conference on Communications, Sep. 21-24, 2003, vol. 1, pp. 113-118.

Wake, D. et al., "Passive Picocell: A New Concept n Wireless Network Infrastructure," Electronics Letters, Feb. 27, 1997, vol. 33, No. 5, pp. 404-406.

Windyka, John et al., "System-Level Integrated Circuit (SLIC) Technology Development for Phased Array Antenna Applications," Contractor Report 204132, National Aeronautics and Space Administration, Jul. 1997, 94 pages.

Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.

Yu et al., "A Novel Scheme to Generate Single-Sideband Milimeter-Wave Signals by Using Low-Frequency Local Oscillator Signal," IEEE Photonics Technology Letters, vol. 20, No. 7, Apr. 1, 2008, pp. 478-480.

Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.

Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.

Cang-Hasnain, et al., "Ultrahigh-speed laser modulation by injection locking," Chapter 6, Optical Fiber Telecommunication V A: Components and Subsystems, Elsevier Inc., 2008, 20 pages.

Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.

Chrostowski, "Optical Injection Locking of Vertical Cavity Surface Emitting Lasers," Fall 2003, PhD dissertation University of California at Berkely, 122 pages.

Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.

Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.

Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.

(56) References Cited

OTHER PUBLICATIONS

Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.

Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.

Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.

Zhao, "Optical Injection Locking on Vertical-Cavity Surface-Emitting Lasers (VCSELs): Physics and Appications," Fall 2008, PhD dissertation University of California at Berkeley, pp. 1-209.

Author Unknown, "VCSEL Chaotic Synchronization and Modulation Characteristics," Master's Thesis, Southwest Jiatong University, Professor Pan Wei, Apr. 2006, 8 pages (machine translation).

Chowdhury et al., "Mufti-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.

Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.

Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.

Non-Final Office Action for U.S. Appl. No. 13/948,536, dated Jan. 16, 2015, 13 pages.

International Search Report for PCT/IL2014/050657, dated Dec. 1, 2014, 4 pages.

Notice of Allowance for U.S. Appl. No. 13/948,536, dated May 28, 2015, 9 pages.

Notice of Allowance for U.S. Appl. No. 13/948,536, dated Oct. 7, 2015, 7 pages.

Notice of Allowance for U.S. Appl. No. 14/146,964, dated Jul. 14, 2015, 9 pages.

Author Unknown, "DECT: The standard explained," DECT Forum, Feb. 1997, Solothurn, Switzerland, 16 pages.

Tekmar Sistemi s.r.l., "Definition of Wideband Distribution Systems," R4-020721, TSG-RAN Working Group 4 (Radio), meeting #23, Gyeongju, Korea, May 13-17, 2002, 12 pages.

International Search Report for PCT/US2013/038843 dated Jul. 18, 2013, 4 pages.

Non-final Office Action for U.S. Appl. No. 13/873,927 dated Aug. 14, 2015, 19 pages.

Final Office Action for U.S. Appl. No. 13/873,927 dated Feb. 8, 2016, 24 pages.

Advisory Action for U.S. Appl. No. 13/873,927 dated Apr. 14, 2016, 3 pages.

Non-final Office Action for U.S. Appl. No. 13/873,927 dated May 12, 2016, 23 pages.

Notice of Allowance for U.S. Appl. No. 13/873,927, dated Nov. 4, 2016, 8 pages.

Non-final Office Action for U.S. Appl. No. 14/972,149, dated Apr. 7, 2016, 9 pages.

Notice of Allowance for U.S. Appl. No. 14/972,149, dated Aug. 15, 2016, 9 pages.

Non-Final Office Action for U.S. Appl. No. 15/042,532, dated Sep. 30, 2016, 13 pages.

Final Office Action for U.S. Appl. No. 15/794,605, dated Oct. 26, 2018, 11 pages.

Notice of Allowance for U.S. Appl, No. 15/974,007, dated Jan. 7, 2019, 7 pages.

\* cited by examiner

REDUCING OUT-OF-CHANNEL NOISE IN A WIRELESS DISTRIBUTION SYSTEM (WDS)

BACKGROUND

The disclosure relates generally to reducing out-of-channel noise in a wireless distribution system (WDS), such as a distributed antenna system (DAS) and, more particularly, to reducing out-of-channel noise using digital filtering in remote units in the WDS.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of distributed antenna systems (DASs). DASs include remote units configured to receive and transmit communications signals to client devices within the antenna range of the remote units. DASs can be particularly useful when deployed inside buildings or other indoor environments where the wireless communications devices may not otherwise be able to effectively receive radio frequency (RF) signals from a source.

In this regard, FIG. 1 illustrates distribution of communications services to remote coverage areas 100(1)-100(N) of a wireless distribution system (WDS) provided in the form of a DAS 102, wherein 'N' is the number of remote coverage areas. These communications services can include cellular services, wireless services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a head-end equipment (HEE) 106 (e.g., a head-end controller, a head-end unit, or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the remote units 104(1)-104(N). The remote units 104(1)-104(N) are configured to receive the downlink communications signals 110D from the HEE 106 over a communications medium 112 to be distributed to the respective remote coverage areas 100(1)-100(N) of the remote units 104(1)-104(N). In a non-limiting example, the communications medium 112 may be a wired communications medium, a wireless communications medium, or an optical fiber-based communications medium. Each of the remote units 104(1)-104(N) may include an RF transmitter/receiver (not shown) and a respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

With reference to FIG. 1, the downlink communications signals 110D transmitted to the client devices 116 from the remote units 104(1)-104(N) may be required to comply with a spectrum emission mask (SEM), which is conventionally mandated by regulatory authorities such as the Federal Communications Commission (FCC) of the United States. The SEM is a mathematically defined emission ceiling applied to transmissions of the downlink communications signals 110D. The SEM is intended to reduce adjacent channel interference by limiting excessive emission beyond the intended bandwidth of the downlink communications signals 110D (also referred to as "out-of-channel" emission). In this regard, it may be desired to provide the downlink communications signals 110D in the DAS 102 to be transmitted in compliance with the SEM corresponding to the communications services.

No admission is made that any reference cited herein constitutes prior art. Applicant expressly reserves the right to challenge the accuracy and pertinency of any cited documents.

SUMMARY

Embodiments of the disclosure relate to reducing out-of-channel noise in a wireless distribution system (WDS), such as a distributed antenna system (DAS), for example. In a WDS, a plurality of remote units communicatively coupled to a head unit are each configured to receive a downlink digital communications signal in a predefined frequency channel(s) having a predefined bandwidth from a central unit. The remote units are configured to convert the downlink digital communications signal into a downlink radio frequency (RF) communications signal and amplify the downlink RF communications signal before distributing the downlink RF communications signal to respective client devices in the WDS. The downlink digital communications signal may contain analog components that introduce out-of-channel noise, such as energy leaking beyond the predefined bandwidth of the predefined frequency channel(s), third order intermodulation products, spectral regrowth, and/or spectral spurs, into the downlink RF communications signal. Thus, this out-of-channel noise is amplified along with amplification of the downlink RF communications signal, which may lead to the amplified downlink RF communications signal being non-compliant with a spectrum emission mask (SEM).

In this regard, in one aspect, digital filtering is provided by the remote units in the WDS to suppress out-of-channel noise in received downlink digital communications signal based on at least one filter configuration parameter received from one or more control circuits. The control circuit(s) is configured to determine the at least one filter configuration parameter based on physical characteristics (e.g., center frequency, bandwidth, power level, communication standard, etc.) of the downlink digital communications signal. By suppressing the out-of-channel noise associated with the downlink digital communications signal in the remote units, the downlink RF communications signal may more easily comply with a SEM when the downlink RF communications signal is amplified in the remote units for distribution to respective client devices. Further, as an example, by suppressing out-of-channel noise at the remote units in the WDS, it may not be necessary for the central unit to perform digital filtering before distributing the downlink digital communications signal to the remote units, thus helping to reduce complexity, cost, physical size, and/or power consumption of the central unit.

One embodiment of the disclosure relates to a remote unit in a WDS configured to exchange communications signals with a plurality of remote units. The remote unit comprises a digital filter. The digital filter is configured to receive a downlink digital communications signal in a predefined frequency channel having a predefined bandwidth for at least one communications service from a central unit in the WDS. The digital filter is also configured to output a modified downlink digital communications signal based on the downlink digital communications signal and at least one filter configuration parameter received from a control circuit configured to determine the at least one filter configuration parameter based on one or more physical characteristics of the downlink digital communications signal to suppress out-of-channel noise in the downlink digital communications signal. The remote unit also comprises a digital-to-analog converter (DAC) configured to convert the modified downlink digital communications signal into a downlink RF communications signal. The remote unit also comprises a power amplifier configured to generate an amplified downlink RF communications signal based on the downlink RF communications signal for communication to one or more client devices in the WDS. The digital filter is also configured to suppress the out-of-channel noise in the downlink digital communications signal to provide for the amplified downlink RF communications signal to comply with a SEM for the at least one communications service.

Another embodiment of the disclosure relates to a method for reducing out-of-channel noise in a remote unit in a WDS comprising a plurality of remote units. The method comprises receiving a downlink digital communications signal in a predefined frequency channel having a predefined bandwidth for at least one communications service. The method also comprises outputting a modified downlink digital communications signal based on the downlink digital communications signal and at least one filter configuration parameter determined based on one or more physical characteristics of the downlink digital communications signal to suppress out-of-channel noise in the downlink digital communications signal. The method also comprises converting the modified downlink digital communications signal into a downlink RF communications signal. The method also comprises generating an amplified downlink RF communications signal based on the downlink RF communications signal for communication to one or more client devices in the WDS. The method also comprises suppressing the out-of-channel noise in the downlink digital communications signal to provide for the amplified downlink RF communications signal to comply with a SEM for the at least one communications service.

Another embodiment of the disclosure relates to a WDS. The WDS comprises a central unit configured to communicate one or more downlink digital communications signals to a central unit communications interface communicatively coupled to at least one downlink communications medium. The WDS also comprises a plurality of remote units. Each of the plurality of remote units comprises a remote unit communications interface communicatively coupled to the at least one downlink communications medium to receive a downlink digital communications signal among the one or more downlink digital communications signals communicated by the central unit. Each of the plurality of remote units also comprises a digital filter. The digital filter is configured to receive the downlink digital communications signal in a predefined frequency channel having a predefined bandwidth for at least one communications service. The digital filter is also configured to output a modified downlink digital communications signal based on the downlink digital communications signal and at least one filter configuration parameter received from a control circuit configured to determine the at least one filter configuration parameter based on one or more physical characteristics of the downlink digital communications signal to suppress out-of-channel noise in the downlink digital communications signal. Each of the plurality of remote units also comprises a DAC configured to convert the modified downlink digital communications signal into a downlink RF communications signal. Each of the plurality of remote units also comprises a power amplifier configured to generate an amplified downlink RF communications signal based on the downlink RF communications signal for communication to one or more client devices in the WDS. The digital filter is further configured to suppress the out-of-channel noise in the downlink digital communications signal to provide for the amplified downlink RF communications signal to comply with a SEM for at least one communications service.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to reducing out-of-channel noise in a wireless distribution system (WDS), such as a distributed antenna system (DAS), for example. In a WDS, a plurality of remote units communicatively coupled to a head end unit are each configured to receive a downlink digital communications signal in a predefined frequency channel(s) having a predefined bandwidth from a central unit. The remote units are configured to convert the downlink digital communications signal into a downlink radio frequency (RF) communications signal and amplify the downlink RF communications signal before distributing the downlink RF communications signal to respective client devices in the WDS. The downlink digital communications signals may contain analog components that introduce out-of-channel noise, such as energy leaking beyond the predefined bandwidth of the predefined frequency channel(s), third order intermodulation products, spectral regrowth, and/or spectral spurs, into the downlink RF communications signal. Thus, this out-of-channel noise is amplified along with amplification of the downlink RF communications signal, which may lead to the amplified downlink RF communications signal being non-compliant with a spectrum emission mask (SEM).

In this regard, in one aspect, digital filtering is provided by the remote units in the WDS to suppress out-of-channel noise in received downlink digital communications signal based on at least one filter configuration parameter received from one or more control circuits. The control circuit(s) is configured to determine the at least one filter configuration parameter based on physical characteristics (e.g., center frequency, bandwidth, power level, communication standard, etc.) of the downlink digital communications signal. By suppressing the out-of-channel noise associated with the downlink digital communications signal in the remote units, the downlink RF communications signal may more easily comply with a SEM when the downlink RF communications signal is amplified in the remote units for distribution to respective client devices. Further, as an example, by suppressing out-of-channel noise at the remote units in the WDS, it may not be necessary for the central unit to perform digital filtering before distributing the downlink digital communications signal to the remote units, thus helping to reduce complexity, cost, physical size, and/or power consumption of the central unit.

Before discussing examples of reducing out-of-channel noise in a WDS (e.g., a DAS) employing digital filtering in one or more remote units to reduce out-of-channel noise of a downlink digital communications signal starting at FIG. 3, an overview of an exemplary WDS for distributing one or more downlink digital communications signals without suppressing out-of-channel noise in the downlink digital communications signals is first discussed with reference to FIGS. 2A-2C.

Figure 1:
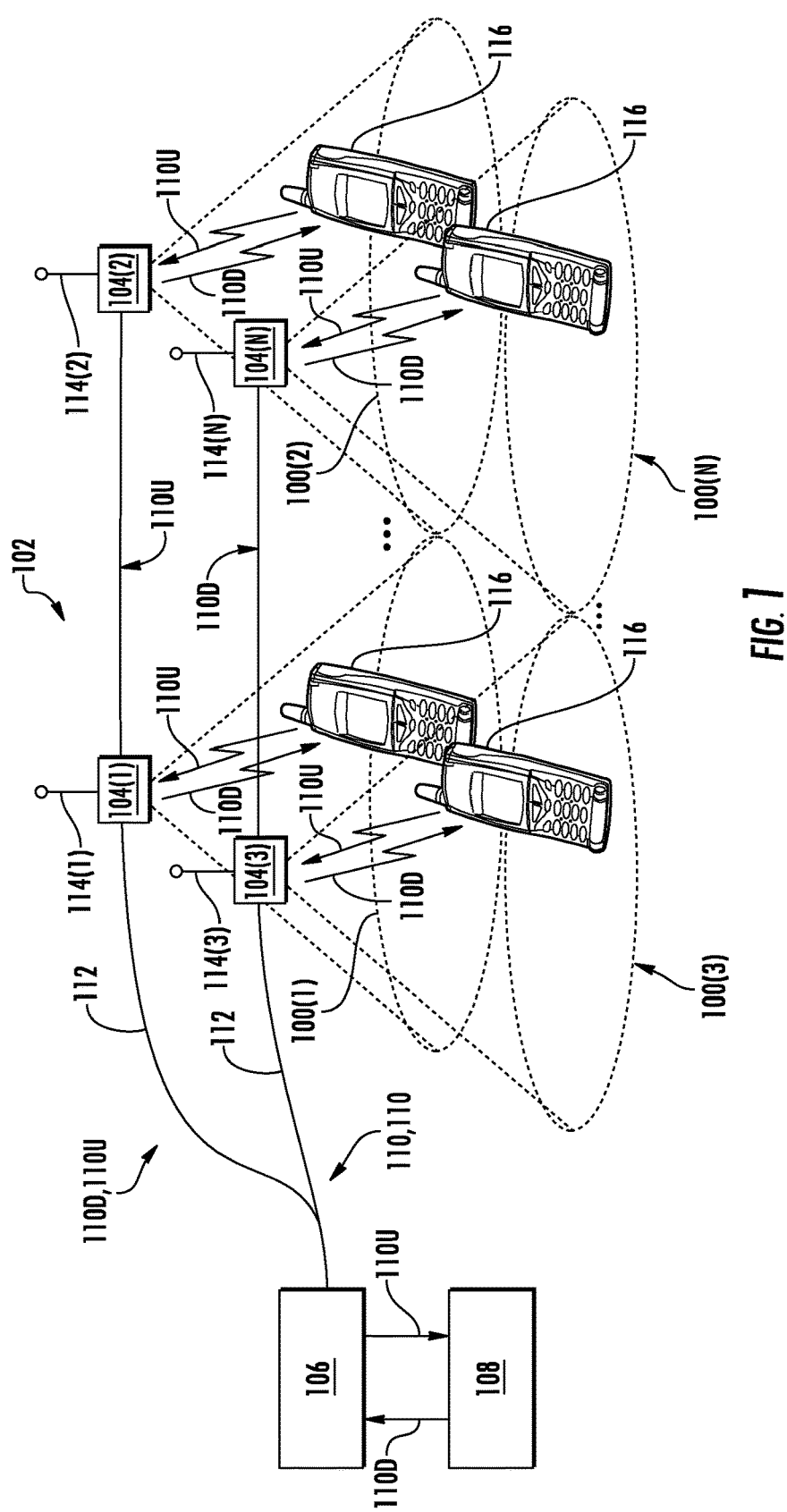
FIG. 1 is a schematic diagram of an exemplary wireless distribution system (WDS)
Figure 2A:
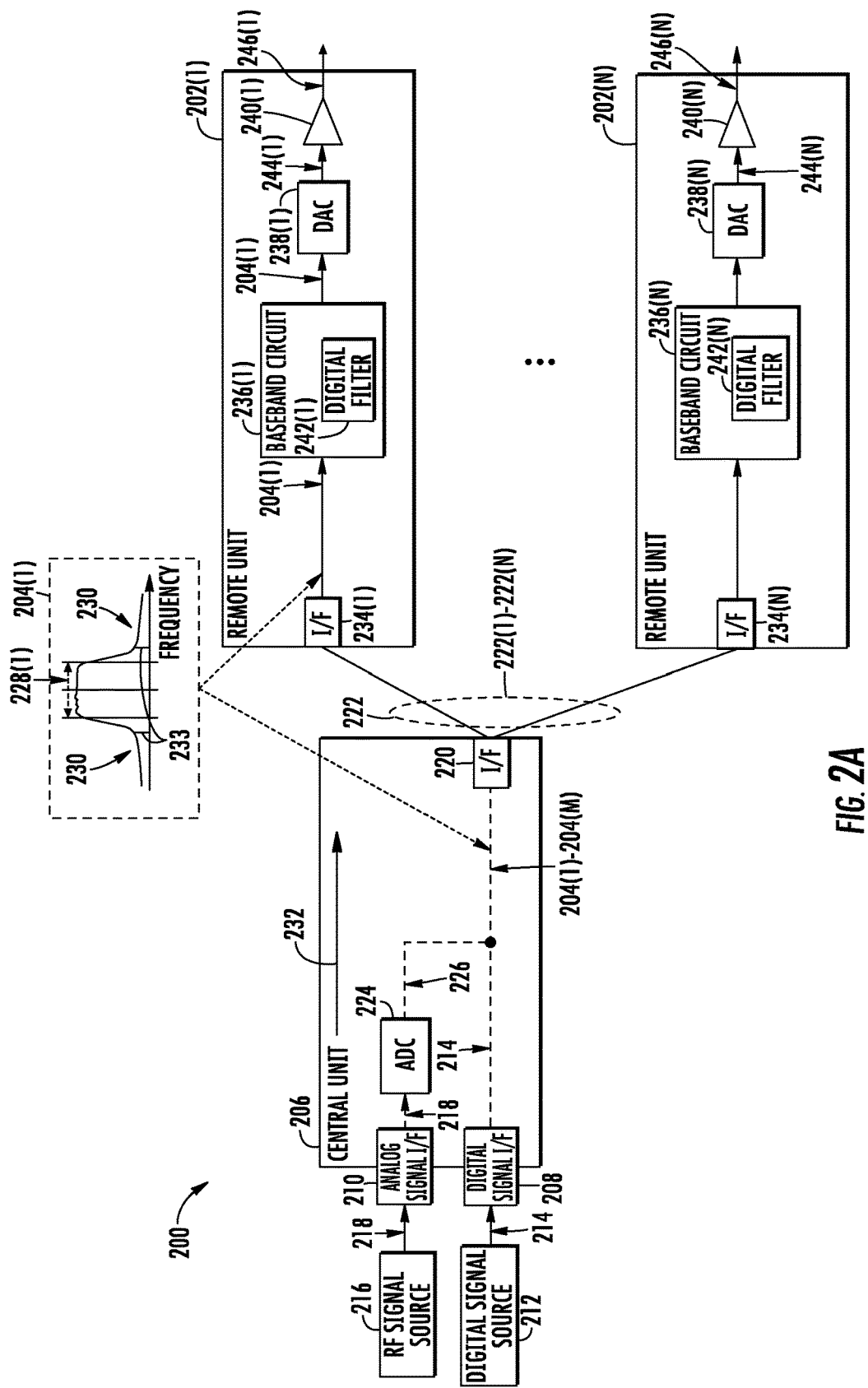
FIG. 2A is a schematic diagram of an exemplary WDS that includes a plurality of remote units configured to receive and distribute one or more downlink digital communications signals without suppressing out-of-channel noise associated with the one or more downlink digital communications signals.

In this regard, FIG. 2A is a schematic diagram of an exemplary WDS 200. The WDS 200 includes a plurality of remote units 202(1)-202(N) configured to receive and distribute one or more downlink digital communications signals 204(1)-204(M) without suppressing out-of-channel noise associated with the downlink digital communications signals 204(1)-204(M). The WDS 200 includes a central unit 206. The central unit 206 includes a digital signal interface 208 and an analog signal interface 210. The digital signal interface 208 may be communicatively coupled to a digital signal source 212 to receive a digital downlink communications signal 214. In a non-limiting example, the digital signal source 212 may be a baseband unit (BBU), and the digital downlink communications signal 214 may be provided according to a common public radio interface (CPRI) protocol. The analog signal interface 210 may be communicatively coupled to an RF signal source 216 to receive an analog downlink communications signal 218. In a non-limiting example, the RF signal source 216 may be a base transceiver station (BTS). In this regard, the central unit 206 may receive the digital downlink communications signal 214 and the analog downlink communications signal 218 concurrently for distribution in the WDS 200.

The central unit 206 also includes a central unit communications interface 220. The central unit communications interface 220 is coupled to at least one downlink communications medium 222. In this example, the downlink communications medium 222 is comprised of a plurality of downlink communications media 222(1)-222(N) each dedicated to a link to a remote unit 202 among the remote units 202(1)-202(N). In a non-limiting example, the central unit communications interface 220 is a digital communications interface for distributing the downlink digital communications signals 204(1)-204(M) to the remote units 202(1)-202(N). Since the central unit 206 may concurrently receive the digital downlink communications signal 214 and the analog downlink communications signal 218, the downlink digital communications signals 204(1)-204(M) may include both the digital downlink communications signal 214 and the analog downlink communications signal 218. As such, an analog-to-digital converter (ADC) 224 is provided in the central unit 206 to convert the analog downlink communications signal 218 into a second digital downlink communications signal 226. In this regard, the downlink digital communications signals 204(1)-204(M) may include the digital downlink communications signal 214 and/or the second digital downlink communications signal 226.

The downlink digital communications signals 204(1)-204(M) occupy one or more frequency channels (not shown) each having a predefined bandwidth 228(1)-228(M) (228(2)-228(M) not shown). For example, the downlink digital communications signal 204(1) may occupy a seven hundred forty-eight megahertz (748 MHz) channel with a predefined bandwidth 228(1) of five MHz (5 MHz). The downlink digital communications signal 204(2) may occupy a seven hundred sixty-two MHz (762 MHz) channel with a predefined bandwidth 228(2) of ten MHz (10 MHz). For the convenience of discussion and illustration, the downlink digital communications signal 204(1) and the remote unit 202(1) are discussed hereinafter as non-limiting examples.

With continuing reference to FIG. 2A, the downlink digital communications signal 204(1) is received by the central unit 206 via the analog signal interface 210. As such, the downlink digital communications signal 204(1) may contain analog components (not shown) that may be distorted due to imperfections of analog processing elements, thus creating out-of-channel noise 230 outside the predefined bandwidth 228(1) of the downlink digital communications signal 204(1). In a non-limiting example, non-linearity in a power amplifier (not shown) in a downlink signal path 232, may distort the downlink digital communications signal 204(1). In this regard, the out-of-channel noise 230 includes energy leaking beyond the predefined bandwidth 228(1) of a predefined frequency channel (e.g., 748 MHz channel). In one example, the out-of-channel noise 230 includes third order intermodulation products 233 that may be created above and below the predefined bandwidth 228(1) when the downlink digital communications signal 204(1) and the downlink digital communications signal 204(2) are fed through the non-linear power amplifier. For example, the downlink digital communications signal 204(1) and the downlink digital communications signal 204(2) correspond to center frequencies $f_1$ and $f_2$, respectively. The third order intermodulation products 233 will occur at frequencies $(2f_1-f_2)$ and $(2f_2-$ In another example, the out-of-channel noise 230 may include inherent noise associated with the analog processing elements (e.g., the power amplifier and the ADC 224) and the downlink signal path 232. In another example, the out-of-channel noise 230 may include spectral regrowth and/or spectral spur (not shown), which is created by the non-linear power amplifier when the downlink digital communications signal 204(1) and the downlink digital communications signal 204(2) are varying envelope signals. In this regard, the out-of-channel noise 230 includes the energy leaking beyond the predefined bandwidth 228(1) of a predefined frequency channel, the third order intermodulation products 233, and the spectral regrowth and/or spectral spur.

With continuing reference to FIG. 2A, the remote units 202(1)-202(N) include a plurality of remote unit communications interfaces 234(1)-234(N), respectively. The remote unit communications interfaces 234(1)-234(N) are each communicatively coupled to the downlink communications medium 222 to receive the downlink digital communications signals 204(1)-204(M). The remote units 202(1)-202(N) include a plurality of baseband circuits 236(1)-236(N), a plurality of digital-to-analog converters (DACs) 238(1)-238(N), and a plurality of power amplifiers 240(1)-240(N), respectively. The baseband circuits 236(1)-236(N) further include a plurality of digital filters 242(1)-242(N), respectively. The DACs 238(1)-238(N) generate a plurality of downlink RF communications signals 244(1)-244(N), respectively. The power amplifiers 240(1)-240(N) amplify the downlink RF communications signals 244(1)-244(N) to generate a plurality of amplified downlink RF communications signals 246(1)-246(N), respectively. The remote unit 202(1) receives the downlink digital communications signal 204(1) via the remote unit communications interface 234(1). The out-of-channel noise 230 in the received downlink digital communications signal 204(1) may have increased further due to inherent noise associated with the downlink communications medium 222. The downlink digital communications signal 204(1) may pass through the digital filter 242(1) in the baseband circuit 236(1) without adequate suppression of the out-of-channel noise 230. The DAC 238(1) converts the downlink digital communications signal 204(1) into the downlink RF communications signal 244(1).

The downlink RF communications signal 244(1) is amplified by the power amplifier 240(1) to generate the amplified downlink RF communications signal 246(1) for distribution to one or more client devices (not shown) in the WDS 200.

Some regulatory authorities, such as the Federal Communications Commission (FCC) of the United States, mandate that the amplified downlink RF communications signals 246(1)-246(N) be transmitted in compliance with a spectrum emission mask (SEM). As such, the amplified downlink RF communications signal 246(1) must comply with the SEM determined by the regulatory authorities. However, the out-of-channel noise 230 present in the amplified downlink RF communications signal 246(1) may cause the amplified downlink RF communications signal 246(1) not be in compliance with the SEM for the communications service provided by the amplified downlink RF communications signal 246(1).

Figure 2B:
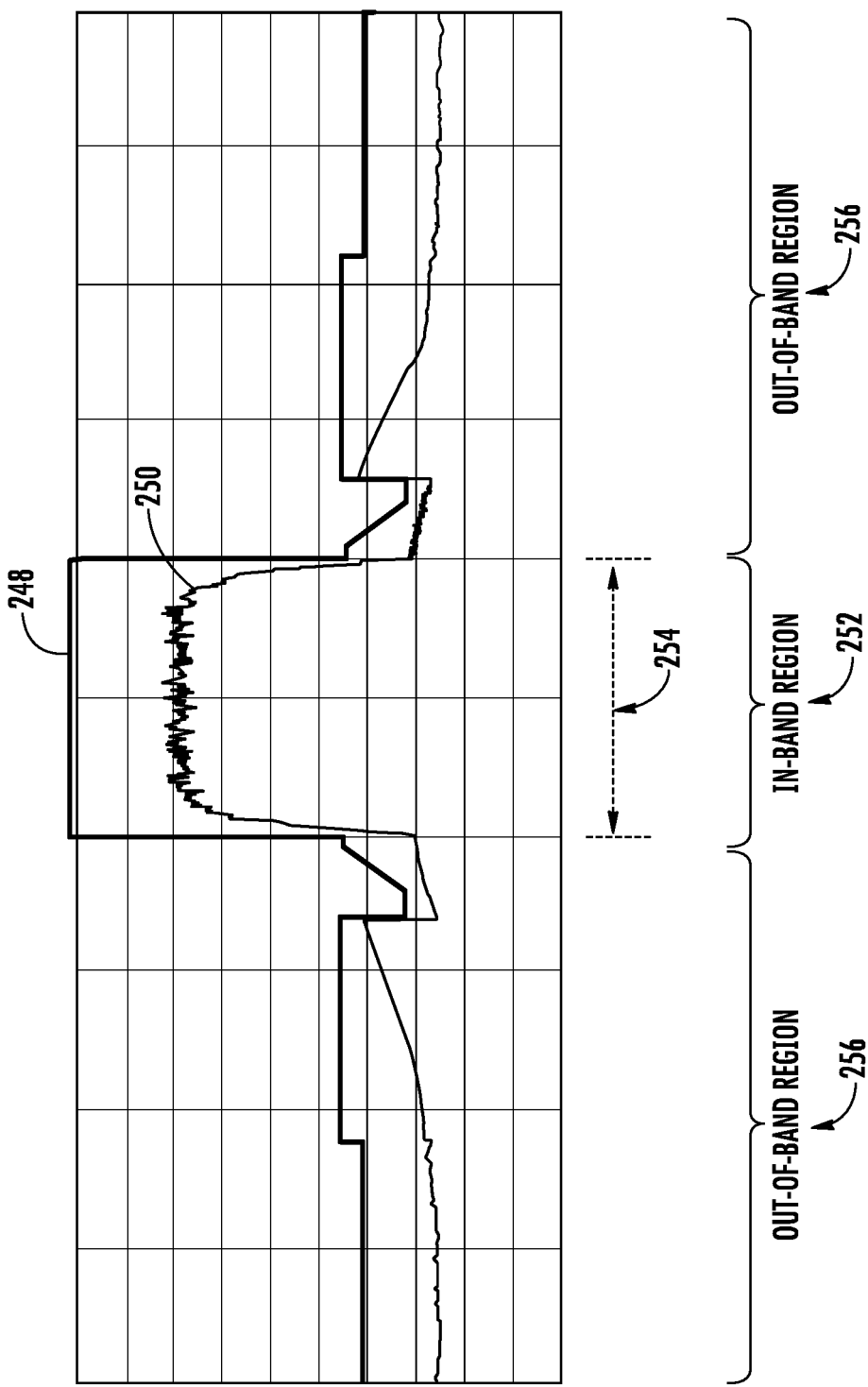
FIG. 2B is an exemplary plot illustrating an exemplary spectrum emission mask (SEM) for a single-channel RF communications signal.

In this regard, FIG. 2B is an exemplary plot illustrating a SEM 248 for a single-channel RF communications signal 250. The SEM 248 is a mathematically defined emission ceiling applied to transmissions of the single-channel RF communications signal 250. To comply with the SEM 248, energy emissions from the single-channel RF communications signal 250 must stay below the SEM 248 in an in-channel region 252, which is within a predefined bandwidth 254. The energy emissions from the single-channel RF communications signal 250 must also stay below the SEM 248 in out-of-channel regions 256 that fall outside the predefined bandwidth 254. The SEM 248 may be associated with a specific communications technology, such as long-term evolution (LTE), and/or a specific RF spectrum (e.g., 748 MHz channel or 762 MHz channel). In a non-limiting example, the single-channel RF communications signal 250 may be the same as the amplified downlink RF communications signal 246(1) of FIG. 2A. In this regard, energy emissions of the amplified downlink RF communications signal 246(1) must stay below the SEM 248 in both the in-channel region 252 and the out-of-channel regions 256 to satisfy the mandatory regulatory requirements.

In a non-limiting example, the amplified downlink RF communications signal 246(1) may be transmitted over multiple frequency channels (not shown). In this regard, FIG. 2C is an exemplary plot illustrating a SEM 258 for a multi-channel RF communications signal 260. With reference to FIG. 2C, the multi-channel RF communications signal 260 occupies a plurality of frequency channels 262(1)-262(0). To comply with the SEM 258, energy emissions from the multi-channel RF communications signal 260 must stay below the SEM 258 in an in-channel region 264, which is within a predefined bandwidth 266 corresponding to the frequency channels 262(1)-262(0), and in out-of-channel regions 268 that fall outside the predefined bandwidth 266. In a non-limiting example, the multi-channel RF communications signal 260 may be the same as the amplified downlink RF communications signal 246(1) of FIG. 2A. In this regard, energy emissions of the amplified downlink RF communications signal 246(1) must stay below the SEM 258 in both the in-channel region 264 and the out-of-channel regions 268 to satisfy the mandatory regulatory requirements.

Figure 2C:
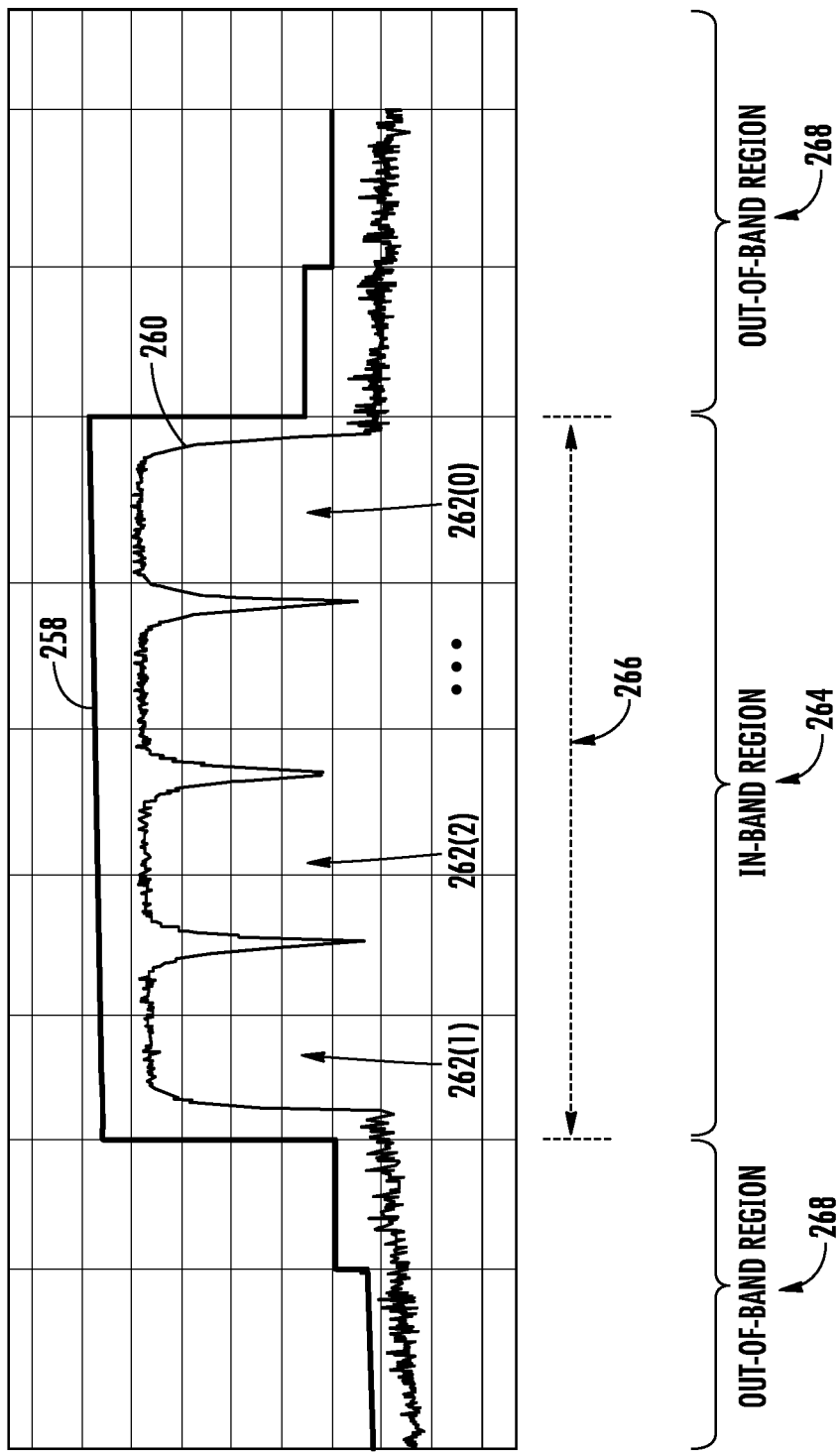
FIG. 2C is an exemplary plot illustrating an exemplary SEM for a multi-channel RF communications signal.

With reference back to FIG. 2A, to provide for compliance of the amplified downlink RF communications signal 246(1) with the SEM 248 of FIG. 2B or the SEM 258 of FIG. 2C, it may be necessary to adequately suppress the out-of-channel noise 230 associated with the downlink digital communications signal 204(1). Specifically, it may be desired to adequately suppress the out-of-channel noise 230 before converting the downlink digital communications signal 204(1) into the downlink RF communications signal 244(1) and amplifying the downlink RF communications signal 244(1) to generate the amplified downlink RF communications signal 246(1). In a conventional WDS like the WDS 200, it may be possible to adequately suppress the out-of-channel noise 230 using one of (or a combination of) the methods described below.

In one aspect, the digital filter 242(1) in the remote unit 202(1) could be enhanced to provide a sharper cut-off of the out-of-channel noise 230. However, upgrading the digital filter 242(1) to a sharp filter may lead to increased processing delay and higher component costs of the remote unit 202(1). According to another aspect, it may be possible to adequately suppress the out-of-channel noise 230 in the central unit 206 before providing the downlink digital communications signals 204(1)-204(M) to the central unit communications interface 220. However, since the downlink digital communications signals 204(1)-204(M) may occupy a much wider spectrum, a broadband digital filter or multiple narrowband digital filters may be required. In this regard, the central unit 206 would require higher performance circuits to support the broadband digital filter or the multiple narrowband digital filters. As a result, it may be necessary to upgrade the central unit 206, thus leading to increased complexity, cost, physical size, and power consumption of the central unit 206. Furthermore, digital filtering performed at the central unit 206 will not prevent inherent noise associated with the downlink communications medium 222 from being added to the downlink digital communications signals 204(1)-204(M).

Hence, it may be desired to provide an alternative solution to adequately suppress the out-of-channel noise 230 in the downlink digital communications signals 204(1)-204(M) while overcoming the shortcomings associated with the above two conventional methods. In this regard, FIG. 3 is a schematic diagram of an exemplary WDS 300 including a plurality of remote units 302(1)-302(N) configured to suppress out-of-channel noise 304 that may be associated with one or more downlink digital communications signals 306(1)-306(M) to provide a communications service(s) via a plurality of amplified downlink RF communications signals 308(1)-308(N) that complies with the SEM 248 of FIG. 2B and the SEM 258 of FIG. 2C. By suppressing the out-of-channel noise 304 associated with the downlink digital communications signals 306(1)-306(M) in the remote units 302(1)-302(N), the amplified downlink RF communications signals 308(1)-308(N) may more easily comply with the SEM 248 and the SEM 258 when the amplified downlink RF communications signals 308(1)-308(N) are distributed from the remote units 302(1)-302(N) to respective client devices. Further, as an example, by suppressing out-of-channel noise 304 at the remote units 302(1)-302(N), it is not necessary for a central unit 310 in the WDS 300 to perform digital filtering before distributing the downlink digital communications signals 306(1)-306(M) to the remote units 302(1)-302(N), thus helping to reduce complexity, cost, physical size, and/or power consumption of the central unit 310.

Figure 3:
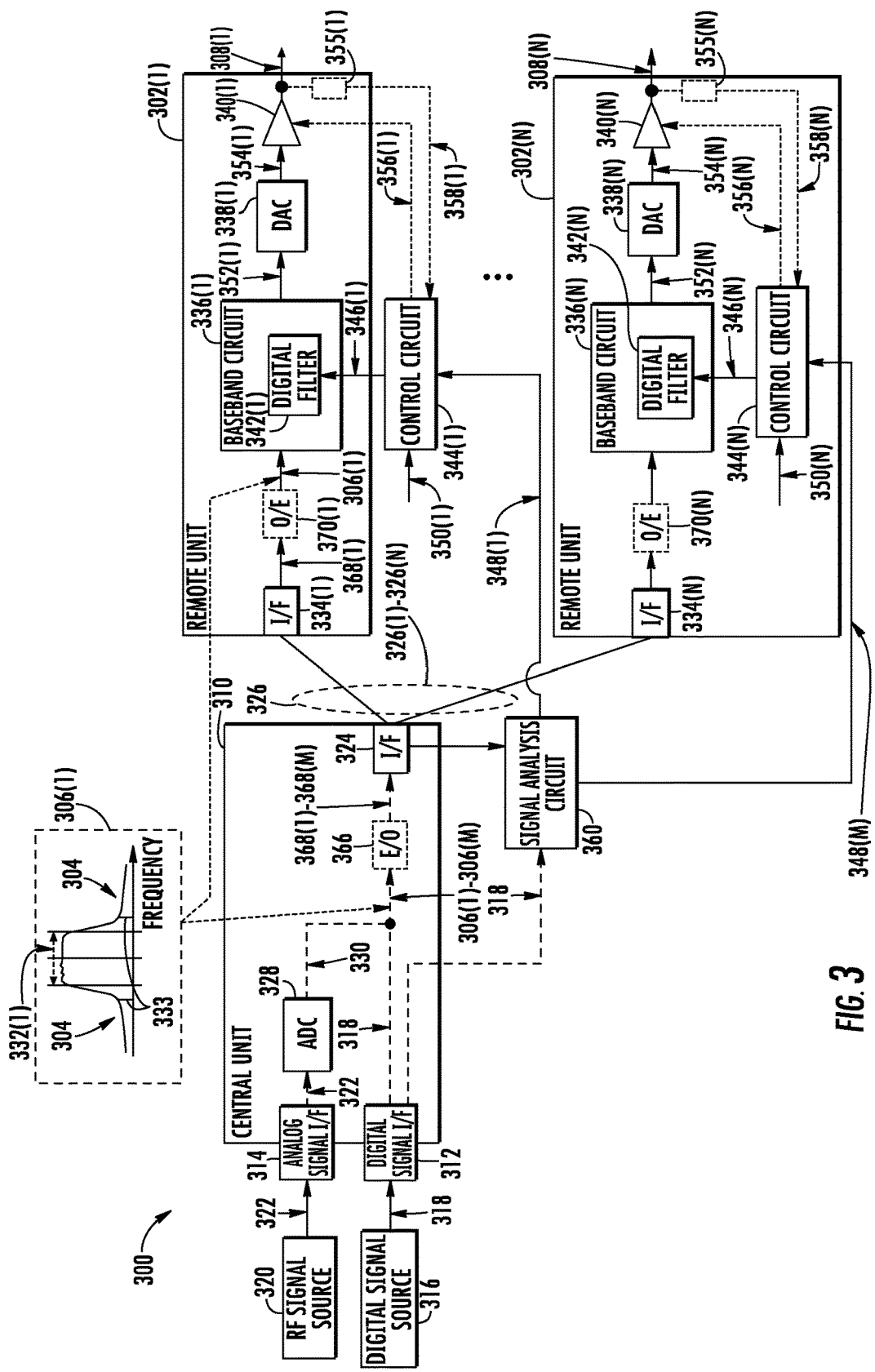
FIG. 3 is a schematic diagram of an exemplary WDS including a plurality of remote units employing a plurality of digital filters to suppress out-of-channel noise that may be associated with one or more downlink digital communications signals to provide a communications service(s) via a plurality of amplified downlink RF communications signals that complies with the SEMs of FIGS. 2B and 2C.

With continuing reference to FIG. 3, the central unit 310 includes a digital signal interface 312 and an analog signal interface 314. The digital signal interface 312 is communicatively coupled to a digital signal source 316 to receive a digital downlink communications signal 318. In a non-limiting example, the digital signal source 316 may be a BBU, and the digital downlink communications signal 318 may be provided according to the CPRI protocol, an open base station architecture initiative (OBSAI) protocol, an open radio equipment interface (ORI) protocol, or a proprietary protocol. The analog signal interface 314 is communicatively coupled to an RF signal source 320 to receive an analog downlink communications signal 322. In a non-limiting example, the RF signal source 320 may be a BTS. In this regard, the central unit 310 may receive the digital downlink communications signal 318 and the analog downlink communications signal 322 concurrently for distribution in the WDS 300.

The central unit 310 also includes a central unit communications interface 324. The central unit communications interface 324 is coupled to at least one downlink communications medium 326. In this example, the downlink communications medium 326 is comprised of a plurality of downlink communications media 326(1)-326(N) each dedicated to communicatively couple to a remote unit 302 among the remote units 302(1)-302(N). In a non-limiting example, the central unit communications interface 324 is a digital communications interface for distributing the downlink digital communications signals 306(1)-306(M) to the remote units 302(1)-302(N). Since the central unit 310 may concurrently receive the digital downlink communications signal 318 and the analog downlink communications signal 322, the downlink digital communications signals 306(1)-306(M) may include both the digital downlink communications signal 318 and the analog downlink communications signal 322. As such, an analog-to-digital converter (ADC) 328 is provided in the central unit 310 to convert the analog downlink communications signal 322 into a second digital downlink communications signal 330, which may be a digital replica of the analog downlink communications signal 322. In this regard, the downlink digital communications signals 306(1)-306(M) may include the digital downlink communications signal 318 and/or the second digital downlink communications signal 330.

The downlink digital communications signals 306(1)-306(M) occupy one or more frequency channels each having a predefined bandwidth 332(1)-332(M) (332(2)-332(M) not shown). For example, the downlink digital communications signal 306(1) may have a predefined bandwidth 332(1). The downlink digital communications signal 306(1) is received by the central unit 310 via the analog signal interface 314. As such, the downlink digital communications signal 306(1) may contain analog components that are distorted due to imperfections of analog processing elements, thus creating the out-of-channel noise 304 outside the predefined bandwidth 332(1) of the downlink digital communications signal 306(1). In this regard, the out-of-channel noise 304 includes energy leaking beyond the predefined bandwidth 332(1). In one example, the out-of-channel noise 304 may include third order intermodulation products 333 that may be created above and below the predefined bandwidth 332(1). In another example, the out-of-channel noise 304 may include spectral regrowth and/or spectral spur (not shown) resulting from all other intermodulation products. In this regard, the out-of-channel noise 304 includes the energy leaking beyond the predefined bandwidth 332(1), the third order intermodulation products 333, and the spectral regrowth and/or spectral spur.

With continuing reference to FIG. 3, the remote units 302(1)-302(N) include a plurality of remote unit communications interfaces 334(1)-334(N), respectively. The remote unit communications interfaces 334(1)-334(N) are each communicatively coupled to the downlink communications media 326(1)-326(N) to receive the downlink digital communications signals 306(1)-306(M), respectively. The remote units 302(1)-302(N) include a plurality of baseband circuits 336(1)-336(N), a plurality of digital-to-analog converters (DACs) 338(1)-338(N), and a plurality of power amplifiers 340(1)-340(N), respectively. The baseband circuits 336(1)-336(N) are configured to provide digital processing to the downlink digital communications signals 306(1)-306(M) (e.g., frequency downshifting, demodulation, error correction, etc.). The baseband circuits 336(1)-336(N) include a plurality of digital filters 342(1)-342(N), respectively. In a non-limiting example, the digital filters 342(1)-342(N) are Butterworth filters and/or Chebyshev filters. The digital filters 342(1)-342(N) are coupled to a plurality of control circuits 344(1)-344(N), respectively. In one example, the control circuits 344(1)-344(N) may be located outside remote unit among the remote units 302(1)-302(N), such as the control circuit 344(1) in the remote unit 302(1). In another example, the control circuits 344(1)-344(N) may be located inside a remote unit among the remote units 302(1)-302(N), such as the control circuit 344(N) illustrated in the remote unit 302(N). The remote units 302(1)-302(N) include a plurality of analog-to-digital converters (ADCs) 355(1)-355(N). The ADCs 355(1)-355(N) enables feedback from the power amplifiers 340(1)-340(N) to the control circuits 344(1)-344(N), respectively.

For the convenience of discussion and illustration, the downlink digital communications signal 306(1) and the remote unit 302(1) are discussed hereinafter as a non-limiting example. It shall be appreciated that aspects discussed with references to the downlink digital communications signal 306(1) and the remote unit 302(1) are applicable to any of the other downlink digital communications signals 306(2)-306(M) and remote units 302(2)-302(N). It shall also be appreciated multiple downlink communications signals among the downlink digital communications signals 306(1)-306(M) may be distributed to the remote unit 302(1).

With continuing reference to FIG. 3, the remote unit 302(1) receives the downlink digital communications signal 306(1), which may be associated with the out-of-channel noise 304. The digital filter 342(1) in the remote unit 302(1) is configured to receive the downlink digital communications signal 306(1) via the remote unit communications interface 334(1). The digital filter 342(1) includes a set of filter configuration parameters that can be dynamically configured by the control circuit 344(1). The control circuit 344(1) is configured to dynamically determine at least one filter configuration parameter 346(1) based on one or more physical characteristics 348(1) of the downlink digital communications signal 306(1). In a non-limiting example, the physical characteristics 348(1) of the downlink digital communications signal 306(1) may include center frequency, bandwidth, power level, and/or communication technology of the downlink digital communications signal 306(1). In a non-limiting example, the control circuit 344(1) uses the center frequency and bandwidth of the downlink digital communications signal 306(1) to configure bandwidth and allowed passband ripple of the digital filter 342(1), thus suppressing the out-of-channel noise 304. For example, the downlink digital communications signal 306(1) may include a long-term evolution (LTE) communications signal or a wideband code division multiple access (WCDMA) communications signal. The LTE communications signal has a center frequency of one thousand nine hundred ninety-two point five megahertz (1992.5 MHz) and a five megahertz (5 MHz) bandwidth. The WCDMA communications signal has a center frequency of one thousand nine hundred sixty-two point five megahertz (1962.5 MHz) and a three point eight four megahertz (3.84 MHz) bandwidth. Based on the center frequency and the bandwidth of the downlink digital communications signal 306(1), the control circuit 344(1) can configure stop band attenuation and order of the digital filter 342(1) accordingly to suppress the out-of-channel noise 304. In this regard, when the physical characteristics 348(1) indicate that the downlink digital communications signal 306(1) is the LTE communications signal, the control circuit 344(1) configures the digital filter 342(1) to operate at 1992.5 MHz center frequency with 5 MHz bandwidth. As such, the digital filter 342(1) can effectively suppress out-of-channel noise 304 located below one thousand nine hundred ninety megahertz (1990 MHz) and above one thousand nine hundred ninety five megahertz (1995 MHz). Likewise, when the physical characteristics 348(1) indicate that the downlink digital communications signal 306(1) is the WCDMA communications signal, the control circuit 344(1) configures the digital filter 342(1) to operate at 1962.5 MHz center frequency with 3.84 MHz bandwidth. As a result, the digital filter 342(1) can effectively suppress out-of-channel noise 304 located below one thousand nine hundred sixty point five eight megahertz (1960.58 MHz) and above one thousand nine hundred sixty-four point four two megahertz (1964.42 MHz). In addition, the control circuit 344(1) may determine the filter configuration parameter 346(1) by further taking into consideration additional information 350(1), which may include adjacent channel power ratio (ACPR) for the downlink digital communications signal 306(1), for example.

With continuing reference to FIG. 3, the digital filter 342(1) is configured to output a modified downlink digital communications signal 352(1) based on the downlink digital communications signal 306(1) and the filter configuration parameter 346(1) received from the control circuit 344(1). In this regard, by reconfiguring the digital filter 342(1) based on the filter configuration parameter 346(1) determined according to the physical characteristics 348(1) of the downlink digital communications signal 306(1), it is possible to adequately suppress the out-of-channel noise 304 in the modified downlink digital communications signal 352(1). In this regard, the modified downlink digital communications signal 352(1) is "cleaner" than the downlink digital communications signal 306(1) as a result of adequate suppression of the out-of-channel noise 304 by the digital filter 342(1). By being "cleaner," the out-of-channel noise 304 in the modified downlink digital communications signal 352(1) is substantially lower than the out-of-channel noise 304 in the downlink digital communications signal 306(1). As such, it may not be necessary for the central unit 310 to suppress the out-of-channel noise 304 before providing the downlink digital communications signal 306(1) to the central unit communications interface 324, thus helping reduce complexity, cost, physical size, and power consumption of the central unit 310. Furthermore, it may also not be necessary to replace the digital filter 342(1) with a sharp digital filter at the remote unit 302(1). As a result, it may help relax digital signal processor (DSP) (e.g., field-programmable gate array (FPGA)) processing loads, thus avoiding unnecessary processing delays that may result from the sharp digital filter.

With continuing reference to FIG. 3, the DAC 338(1) receives and converts the modified downlink digital communications signal 352(1) into a downlink RF communications signal 354(1). The power amplifier 340(1) is configured to amplify the downlink RF communications signal 354(1) to generate the amplified downlink RF communications signal 308(1). As discussed above, the physical characteristics 348(1) of the downlink digital communications signal 306(1) may include center frequency, bandwidth, power level, and/or communication technology of the downlink digital communications signal 306(1). Based on the communication technology, the center frequency, and the bandwidth of the downlink digital communications signal 306(1), the control circuit 344(1) is able to determine the exact spectral emission requirements associated with the SEM 248 of FIG. 2B and/or the SEM 258 of FIG. 2C. Based on the power level of the downlink digital communications signal 306(1) as indicated in the physical characteristics 348(1), the control circuit 344(1) is able to control the power amplifier 340(1) to provide the amplified downlink RF communications signal 308(1) in compliance with the SEM 248 of FIG. 2B and/or the SEM 258 of FIG. 2C.

In a non-limiting example, the control circuit 344(1) is configured to control the power amplifier 340(1) based on the physical characteristics 348(1) of the downlink digital communications signal 306(1) via a control signal 356(1). Additionally, the control circuit 344(1) may receive a SEM feedback signal 358(1) indicating a power level of the amplified downlink RF communications signal 308(1). The ADC 355(1) is configured to convert the amplified downlink RF communications signal 308(1) into the SEM feedback signal 358(1) indicating the power level of the amplified downlink RF communications signal 308(1). Based on the SEM feedback signal 358(1) and the power level of the downlink digital communications signal 306(1), the control circuit 344(1) can adjust the digital filter 342(1) via the filter configuration parameter 346(1) and/or adjust the power amplifier 340(1) via the control signal 356(1) when the control circuit 344(1) determines that the amplified downlink RF communications signal 308(1) exceeds the SEM 248 of FIG. 2B and/or the SEM 258 of FIG. 2C.

With continuing reference to FIG. 3, the control circuits 344(1)-344(N) are communicatively coupled to at least one signal analysis circuit 360. In a non-limiting example, the signal analysis circuit 360 may be provided in the central unit 310 or be collocated with the central unit 310. The signal analysis circuit 360 is configured to determine the physical characteristics 348(1)-340(N) for the downlink digital communications signals 306(1)-306(M). In a non-limiting example, the signal analysis circuit 360 is configured to determine each of the physical characteristics 348(1)-348(M) for each of the downlink digital communications signals 306(1)-306(M) using techniques such as Fast Fourier Transform (FFT). In this regard, the control circuit 344(1) in the remote unit 302(1) receives the physical characteristics 348(1) of the downlink digital communications signal 306(1) from the signal analysis circuit 360. In a non-limiting example, the remote unit 302(1) receives the physical characteristics 348(1) from the signal analysis circuit 360 via the downlink communications medium 326(1).

In one non-limiting example, the signal analysis circuit 360 is communicatively coupled to the central unit communications interface 324. In this regard, the signal analysis circuit 360 can determine the physical characteristics 348(1)-348(M) for the digital downlink communications signal 318 and the second digital downlink communications signal 330 converted from the analog downlink communications signal 322. In another non-limiting example, the signal analysis circuit 360 may be communicatively coupled to the digital signal interface 312. In this regard, the signal analysis circuit 360 can determine the physical characteristics 348(1)-348(M) for the digital downlink communications signal 318.

The remote unit 302(1) may be configured to suppress the out-of-channel noise 304 according to an out-of-channel noise reduction process. In this regard, FIG. 4 is a flowchart of an exemplary out-of-channel noise reduction process 400 that may be employed in each of the remote units 302(1)-302(N) of FIG. 3 to reduce the out-of-channel noise 304 associated with the downlink digital communications signals 306(1)-306(M).

Figure 4:
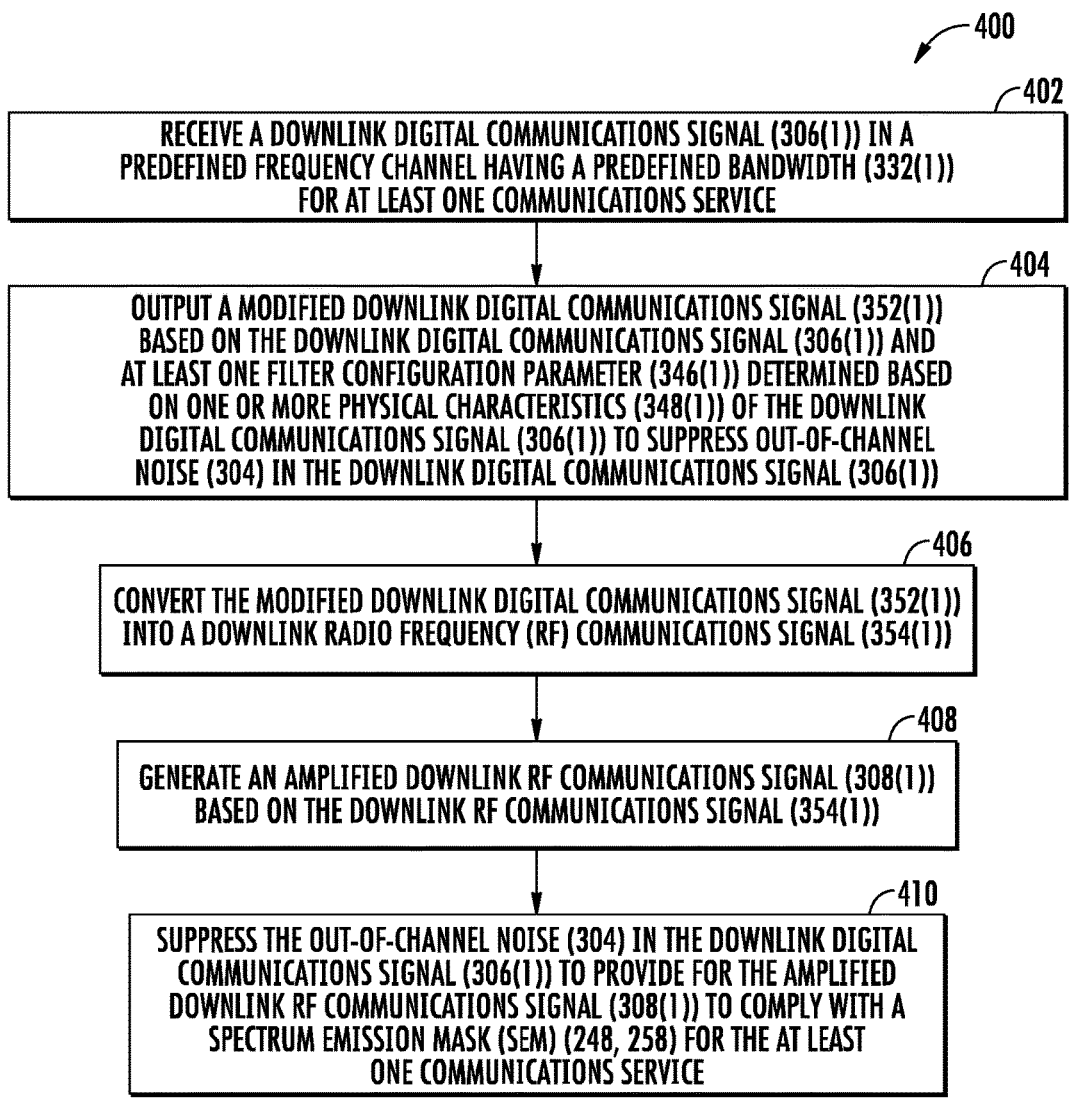
FIG. 4 is a flowchart of an exemplary out-of-channel noise reduction process that may be employed in one or more of the plurality of remote units in the WDS of FIG. 3, to reduce the out-of-channel noise associated with the one or more downlink digital communications signals.

With reference to FIG. 4, the remote unit 302(1) among the remote units 302(1)-302(N) is configured to receive the downlink digital communications signal 306(1) in the predefined frequency channel (e.g., 748 MHz channel) having the predefined bandwidth 332(1) for at least one communications service (block 402). The digital filter 342(1) is configured to output the modified downlink digital communications signal 352(1) based on the downlink digital communications signal 306(1) and the filter configuration parameter 346(1) determined based on the physical characteristics 348(1) of the downlink digital communications signal 306(1) to suppress the out-of-channel noise 304 in the downlink digital communications signal 306(1) (block 404). The DAC 338(1) is configured to convert the modified downlink digital communications signal 352(1) into the downlink RF communications signal 354(1) (block 406). The power amplifier 340(1) is configured to generate the amplified downlink RF communications signal 308(1) based on the downlink RF communications signal 354(1) (block 408). The digital filter 342(1) is further configured to suppress the out-of-channel noise 304 in the downlink digital communications signal 306(1) to provide for the amplified downlink RF communications signal 308(1) to comply with the SEM 248 of FIG. 2B or the SEM 258 of FIG. 2C for the at least one communications service (block 410).

With reference back to FIG. 3, in a non-limiting example, the WDS 300 is provided as an optical fiber-based WDS. In this regard, the downlink communications medium 326(1) may be an optical fiber-based downlink communications medium. Accordingly, the central unit 310 may include an electrical-to-optical (E/O) converter 366 configured to convert the downlink digital communications signals 306(1)-306(M) into one or more optical downlink digital communications signals 368(1)-368(M). The E/O converter 366 then provides the optical downlink digital communications signals 368(1)-368(M) to the central unit communications interface 324. The remote unit 302(1) includes an optical-to-electrical (O/E) converter 370(1) configured to receive the optical downlink digital communications signal 368(1) among the optical downlink digital communications signals 368(1)-368(M) from the remote unit communications interface 334(1). The O/E converter 370(1) is then configured to convert the optical downlink digital communications signal 368(1) into the downlink digital communications signal 306(1).

Figure 5:
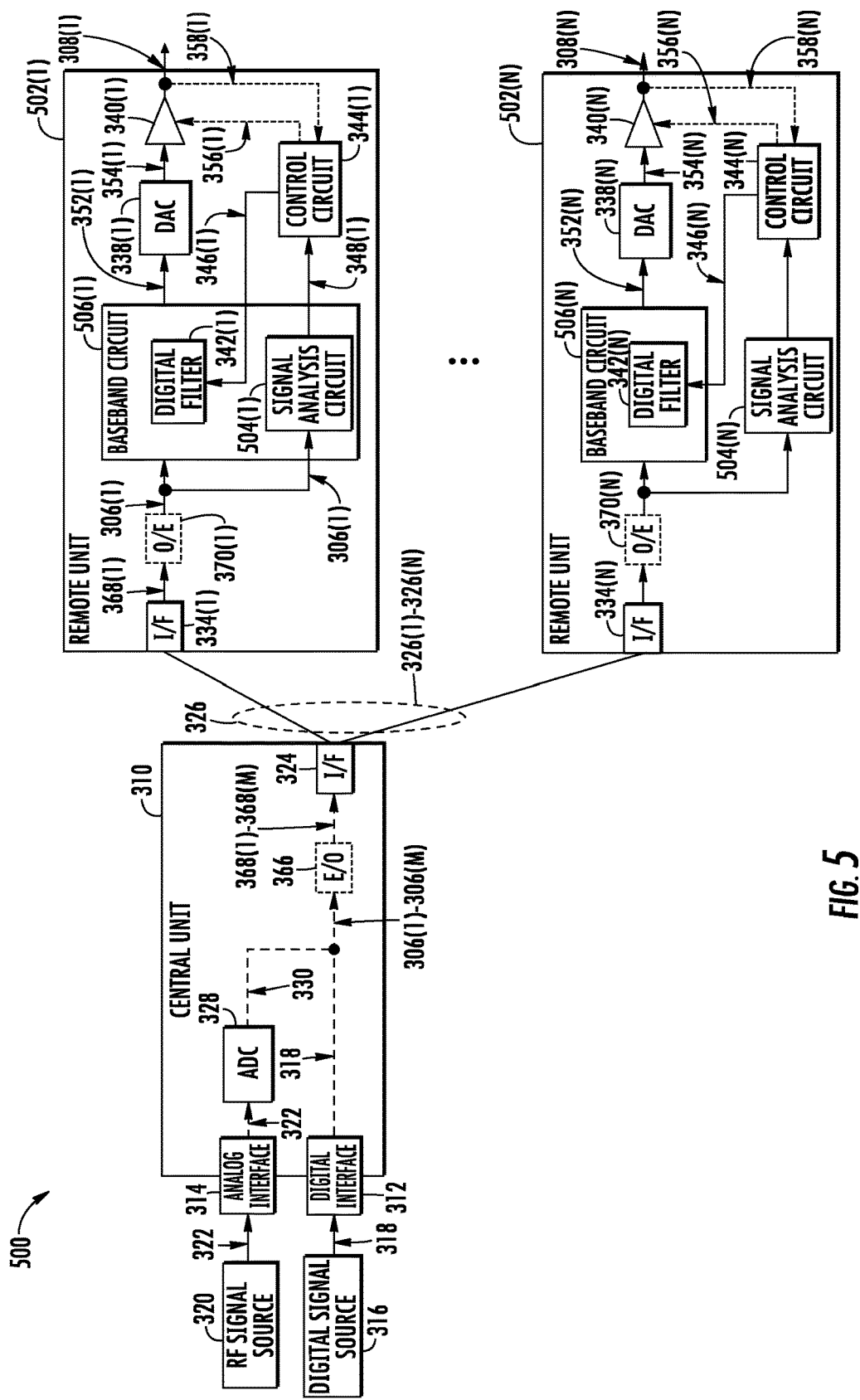
FIG. 5 is a schematic diagram of an exemplary WDS in which a plurality of remote units includes a plurality of signal analysis circuits, respectively, for determining one or more physical characteristics of each of the one or more downlink digital communications signals.

Alternative to providing the signal analysis circuit 360 of FIG. 3 in the central unit 310, or co-locating the signal analysis circuit 360 with the central unit 310, it is also possible to deploy the signal analysis circuit 360 in one or more of the remote units 302(1)-302(N). This may provide more flexibility when the WDS 300 is gradually upgraded to eliminate the analog downlink communications signal 322. In this regard, FIG. 5 is a schematic diagram of an exemplary WDS 500 in which a plurality of remote units 502(1)-502(N) includes a plurality of signal analysis circuits 504(1)-504(N), respectively, for determining the physical characteristics 348(1)-348(M) of each of the downlink digital communications signals 306(1)-306(M). Common elements between FIGS. 3 and 5 are shown therein with common element numbers and will not be re-described herein.

With reference to FIG. 5, the signal analysis circuit 504(1) in the remote unit 302(1) is configured to determine the physical characteristics 348(1) of the downlink digital communications signal 306(1). In one non-limiting example, the signal analysis circuit 504(1) in the remote unit 302(1) may be integrated with a baseband circuit 506(1). In another non-limiting example, the signal analysis circuit 504(N) in the remote unit 302(N) may be provided outside the baseband circuit 506(N).

Figure 6:
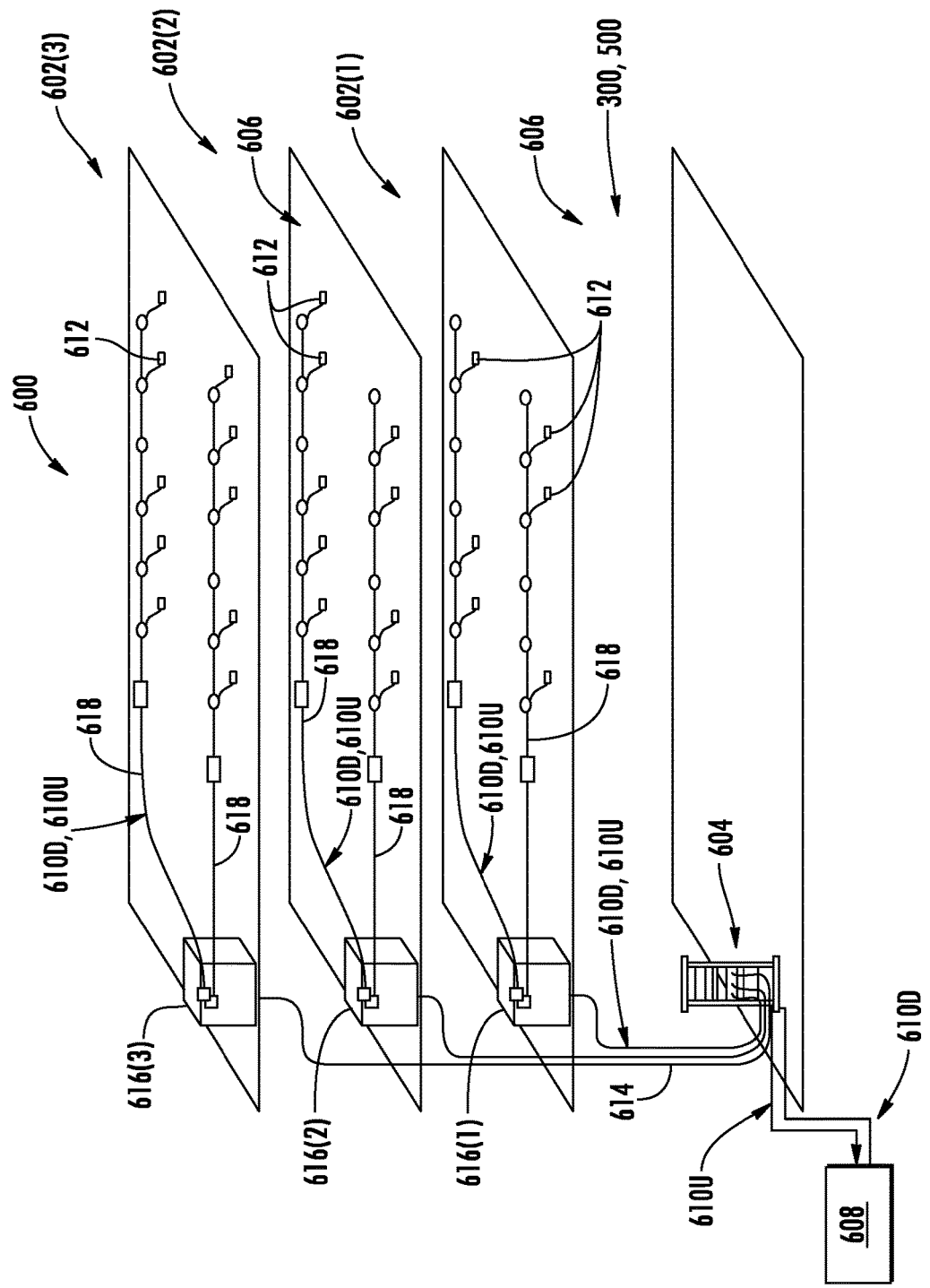
FIG. 6 is a partial schematic cut-away diagram of an exemplary building infrastructure in which WDSs configured to suppress the out-of-channel noise associated with the one or more downlink digital communications signals, including the WDSs of FIGS. 3 and 5, can be provided.

The WDS 300 of FIG. 3 and the WDS 500 of FIG. 5, which are configured to reduce the out-of-channel noise 304 in the downlink digital communications signals 306(1)-306(M), may be provided in an indoor environment, as illustrated in FIG. 6. FIG. 6 is a partial schematic cut-away diagram of an exemplary building infrastructure 600 in which WDSs configured to suppress the out-of-channel noise 304 associated with the downlink digital communications signals 306(1)-306(M), including the WDS 300 of FIG. 3 and the WDS 500 of FIG. 5, can be employed. The building infrastructure 600 in this embodiment includes a first (ground) floor 602(1), a second floor 602(2), and a third floor 602(3). The floors 602(1)-602(3) are serviced by a central unit 604 to provide antenna coverage areas 606 in the building infrastructure 600. The central unit 604 is communicatively coupled to a base station 608 to receive downlink communications signals 610D from the base station 608. The central unit 604 is communicatively coupled to a plurality of remote units 612 to distribute the downlink communications signals 610D to the remote units 612 and to receive uplink communications signals 610U from the remote units 612, as previously discussed above. The downlink communications signals 610D and the uplink communications signals 610U communicated between the central unit 604 and the remote units 612 are carried over a riser cable 614. The riser cable 614 may be routed through interconnect units (ICUs) 616(1)-616(3) dedicated to each of the floors 602(1)-602(3) that route the downlink communications signals 610D and the uplink communications signals 610U to the remote units 612 and also provide power to the remote units 612 via array cables 618.

Figure 7:
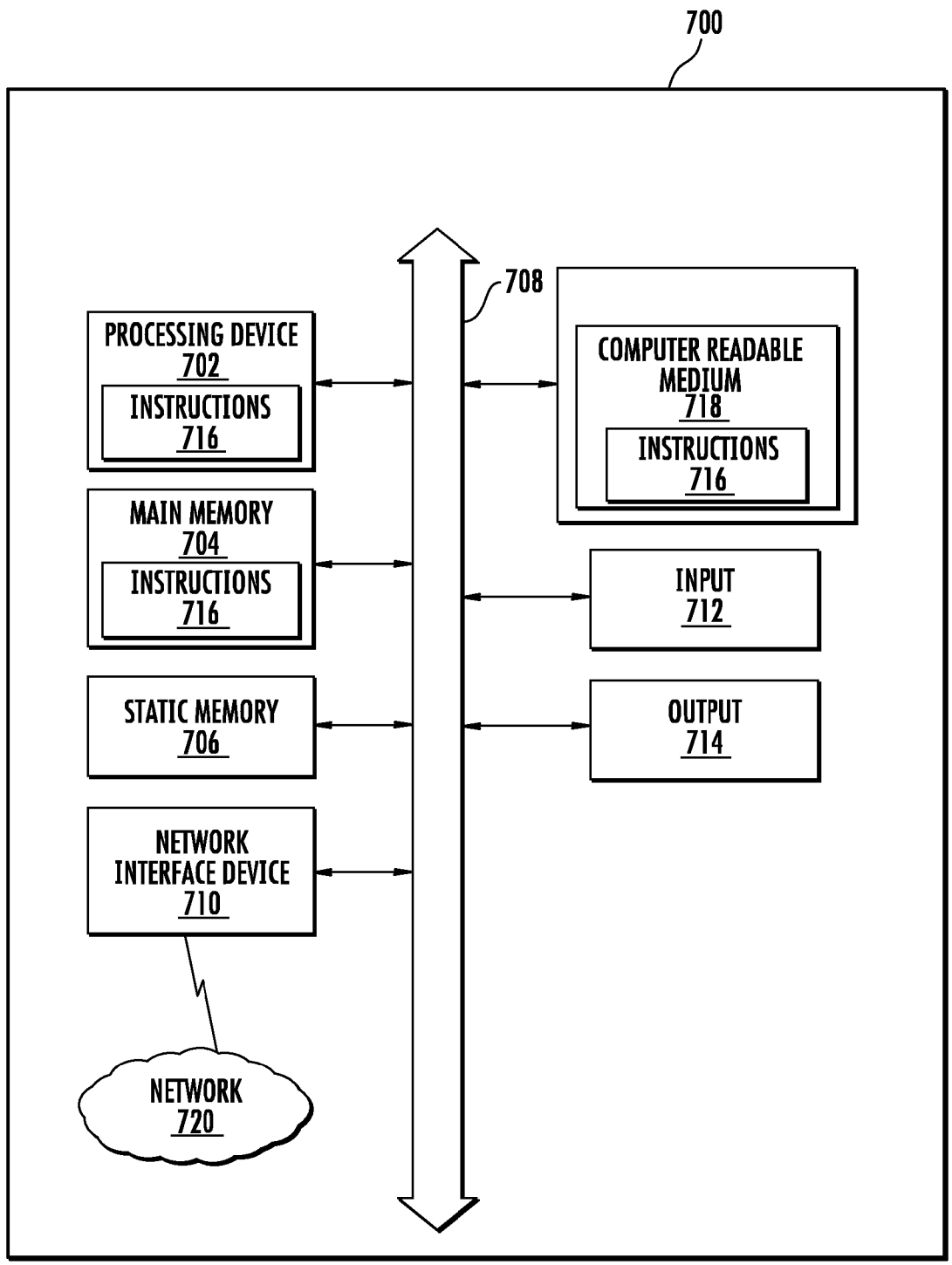
FIG. 7 is a schematic diagram representation of additional detail illustrating an exemplary computer system that could be employed in a control circuit(s) in the plurality of remote units of FIGS. 3 and 5, for reducing the out-of-channel noise associated with the one or more downlink digital communications signals.

FIG. 7 is a schematic diagram representation of additional detail illustrating an exemplary computer system 700 that could be employed in a controller, including the control circuits 344(1)-344(N) in the remote units 302(1)-302(N) of FIG. 3 and the remote units 502(1)-502(N) of FIG. 5, for reducing the out-of-channel noise 304 associated with the downlink digital communications signals 306(1)-306(M). In this regard, the computer system 700 is adapted to execute instructions from an exemplary computer-readable medium to perform these and/or any of the functions or processing described herein.

In this regard, the computer system 700 in FIG. 7 may include a set of instructions that may be executed to predict frequency interference to avoid or reduce interference in a multi-frequency DAS. The computer system 700 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 700 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 700 in this embodiment includes a processing device or processor 702, a main memory 704 (e.g., read-only memory (ROM), flash memory, dynamic random access memory (DRAM), such as synchronous DRAM (SDRAM), etc.), and a static memory 706 (e.g., flash memory, static random access memory (SRAM), etc.), which may communicate with each other via a data bus 708. Alternatively, the processor 702 may be connected to the main memory 704 and/or the static memory 706 directly or via some other connectivity means. The processor 702 may be a controller, and the main memory 704 or the static memory 706 may be any type of memory.

The processor 702 represents one or more general-purpose processing devices, such as a microprocessor, central processing unit, or the like. More particularly, the processor 702 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 702 is configured to execute processing logic in instructions for performing the operations and steps discussed herein.

The computer system 700 may further include a network interface device 710. The computer system 700 also may or may not include an input 712, configured to receive input and selections to be communicated to the computer system 700 when executing instructions. The computer system 700 also may or may not include an output 714, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 700 may or may not include a data storage device that includes instructions 716 stored in a computer-readable medium 718. The instructions 716 may also reside, completely or at least partially, within the main memory 704 and/or within the processor 702 during execution thereof by the computer system 700, the main memory 704 and the processor 702 also constituting computer-readable medium. The instructions 716 may further be transmitted or received over a network 720 via the network interface device 710.

While the computer-readable medium 718 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote unit in a wireless distribution system (WDS) configured to exchange communications signals with a plurality of remote units, comprising:
    a digital filter configured to:
        receive a downlink digital communications signal in a predefined frequency channel having a predefined bandwidth for at least one communications service from a central unit in the WDS; and
        output a modified downlink digital communications signal based on the downlink digital communications signal and at least one filter configuration parameter received from a control circuit configured to determine the at least one filter configuration parameter based on one or more physical characteristics of the downlink digital communications signal to suppress out-of-channel noise in the downlink digital communications signal;
    a digital-to-analog converter (DAC) configured to convert the modified downlink digital communications signal into a downlink radio frequency (RF) communications signal; and
    a power amplifier configured to generate an amplified downlink RF communications signal based on the downlink RF communications signal for communication to one or more client devices in the WDS;
    wherein the digital filter is further configured to suppress the out-of-channel noise in the downlink digital communications signal to provide for the amplified downlink RF communications signal to comply with a spectrum emission mask (SEM) for the at least one communications service.

2. The remote unit of claim 1, where the digital filter is configured to receive the downlink digital communications signal via a remote unit communications interface communicatively coupled to the central unit.

3. The remote unit of claim 1, wherein the one or more physical characteristics of the downlink digital communications signal are comprised of center frequency of the downlink digital communications signal.

4. The remote unit of claim 1, wherein the one or more physical characteristics of the downlink digital communications signal are comprised of bandwidth of the downlink digital communications signal.

5. The remote unit of claim 1, wherein the one or more physical characteristics of the downlink digital communications signal are comprised of power level of the downlink digital communications signal.

6. The remote unit of claim 1, wherein the one or more physical characteristics of the downlink digital communications signal are comprised of communication technology of the downlink digital communications signal.

7. The remote unit of claim 1, wherein the control circuit is configured to determine the at least one filter configuration parameter based on an adjacent channel power ratio (ACPR) for the downlink digital communications signal.

8. The remote unit of claim 1, wherein the control circuit is further configured to control the power amplifier to generate the amplified downlink RF communications signal that complies with the SEM.

9. The remote unit of claim 8, wherein the control circuit is configured to control the power amplifier based on the one or more physical characteristics of the downlink digital communications signal.

10. The remote unit of claim 1, wherein the control circuit is further configured to:
    receive a feedback signal indicating power level of the amplified downlink RF communications signal; and
    adjust the at least one filter configuration parameter when the control circuit determines that the power level of the amplified downlink RF communications signal exceeds the SEM.

11. The remote unit of claim 1 further comprising the control circuit.

12. The remote unit of claim 1, further comprising:
    a baseband circuit configured to provide digital processing to the downlink digital communications signal;
    wherein the baseband circuit comprises the digital filter.

13. The remote unit of claim 1, wherein the out-of-channel noise comprises energy leaked beyond the predefined bandwidth of the predefined frequency channel of the downlink digital communications signal.

14. The remote unit of claim 1, wherein the out-of-channel noise comprises third order intermodulation products.

15. The remote unit of claim 1, wherein the out-of-channel noise comprises spectral regrowth and spectral spur.

16. The remote unit of claim 1 further comprising an optical-to-electrical (O/E) converter configured to convert an optical downlink digital communications signal received from the central unit into the downlink digital communications signal comprising the optical downlink digital communications signal.

17. A method for reducing out-of-channel noise in a remote unit in a wireless distribution system (WDS) comprising a plurality of remote units, comprising:
    receiving a downlink digital communications signal in a predefined frequency channel having a predefined bandwidth for at least one communications service;
    outputting a modified downlink digital communications signal based on the downlink digital communications signal and at least one filter configuration parameter determined based on one or more physical characteristics of the downlink digital communications signal to suppress out-of-channel noise in the downlink digital communications signal;

converting the modified downlink digital communications signal into a downlink radio frequency (RF) communications signal;

generating an amplified downlink RF communications signal based on the downlink RF communications signal for communication to one or more client devices in the WDS; and suppressing the out-of-channel noise in the downlink digital communications signal to provide for the amplified downlink RF communications signal to comply with a spectrum emission mask (SEM) for the at least one communications service.

18. The method of claim 17, comprising determining the at least one filter configuration parameter based on center frequency of the downlink digital communications signal.

19. The method of claim 17, comprising determining the at least one filter configuration parameter based on bandwidth of the downlink digital communications signal.

20. The method of claim 17, comprising determining the at least one filter configuration parameter based on power level of the downlink digital communications signal.

21. The method of claim 17, comprising determining the at least one filter configuration parameter based on communication technology of the downlink digital communications signal.

22. The method of claim 17, comprising determining the at least one filter configuration parameter based on an adjacent channel power ratio (ACPR) for the downlink digital communications signal.

23. The method of claim 17, further comprising:

receiving a feedback signal indicating power level of the amplified downlink RF communications signal; and adjusting the at least one filter configuration parameter when the power level of the amplified downlink RF communications signal is determined to exceed the SEM.

* * * * *